(12) United States Patent
Yanagawa et al.

(10) Patent No.: US 7,859,965 B2
(45) Date of Patent: Dec. 28, 2010

(54) RECORDING DEVICE AND METHOD, REPRODUCING DEVICE AND METHOD, RECORDING/REPRODUCING DEVICE AND METHOD, AND COMPUTER PROGRAM

(75) Inventors: Naoharu Yanagawa, Saitama (JP);
Masufumi Asada, Saitama (JP);
Kunihiko Horikawa, Saitama (JP);
Akira Shirota, Saitama (JP)

(73) Assignee: Pioneer Corporation, Tokyo (JP)

( * ) Notice: Subject to any disclaimer, the term of this patent is extended or adjusted under 35 U.S.C. 154(b) by 487 days.

(21) Appl. No.: 11/918,052

(22) PCT Filed: Apr. 6, 2006

(86) PCT No.: PCT/JP2006/307350

§ 371 (c)(1),
(2), (4) Date: Jan. 9, 2008

(87) PCT Pub. No.: WO2006/109684

PCT Pub. Date: Oct. 19, 2006

(65) Prior Publication Data

US 2009/0067307 A1    Mar. 12, 2009

(30) Foreign Application Priority Data

Apr. 8, 2005    (JP) .............................. 2005-112547

(51) Int. Cl.
*G11B 7/00*    (2006.01)
(52) U.S. Cl. ............... 369/53.12; 369/53.19; 369/53.23
(58) Field of Classification Search ............... 369/44.28, 369/44.29, 53.14, 53.12, 53.15, 53.17, 53.32, 369/53.1, 53.19, 53.23, 44.32
See application file for complete search history.

(56) References Cited

U.S. PATENT DOCUMENTS

| 6,700,844 | B2 * | 3/2004 | Na ........................... 369/53.14 |
| 6,768,705 | B2 * | 7/2004 | Hirai ...................... 369/44.28 |
| 7,317,669 | B2 * | 1/2008 | Lee ......................... 369/44.29 |

FOREIGN PATENT DOCUMENTS

| JP | 58-189842 | 11/1983 |
| JP | 10-320809 | 12/1998 |
| JP | 2000-48489 | 2/2000 |
| JP | 2000-149264 | 5/2000 |
| JP | 2002373419 | 12/2002 |
| JP | 2003-067951 | 3/2003 |
| JP | 2003312146 | 11/2003 |
| JP | 2004-62945 | 2/2004 |
| JP | 2004-347753 | 12/2004 |
| JP | 2005-63491 | 3/2005 |

* cited by examiner

*Primary Examiner*—Nabil Z Hindi
(74) *Attorney, Agent, or Firm*—Young & Thompson

(57) ABSTRACT

A recording device (1T or the like) is provided with (i) recording elements (50, 40) for recording data by irradiating a recording medium with laser beams; (ii) driving members (33T, 33F, 55T, 55F, 54) for performing tracking process or focusing process; (iii) a servo elements (31T, 31F) for automatically controlling the driving members based on an error signal; (iv) specifying elements (21, 22) for specifying an area where a recording medium characteristic (core eccentricity or the like) is not good, based on a high frequency component included in the error signal; and (v) a control unit (10) for (v-i) controlling the servo unit to change the gain in the automatic control, and for (v-ii) controlling the recording elements to change the recording power of the laser beams, in the specified area.

24 Claims, 23 Drawing Sheets

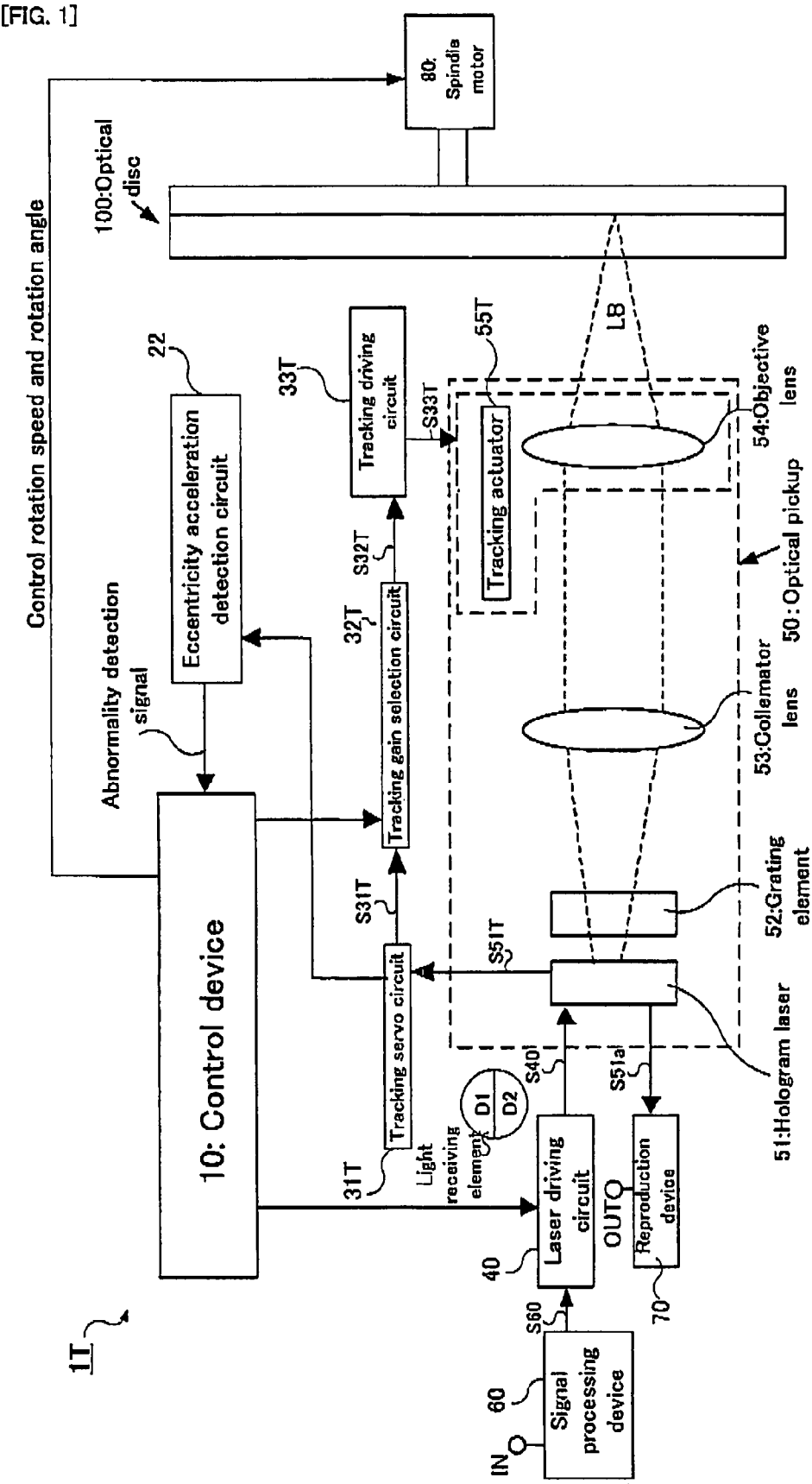

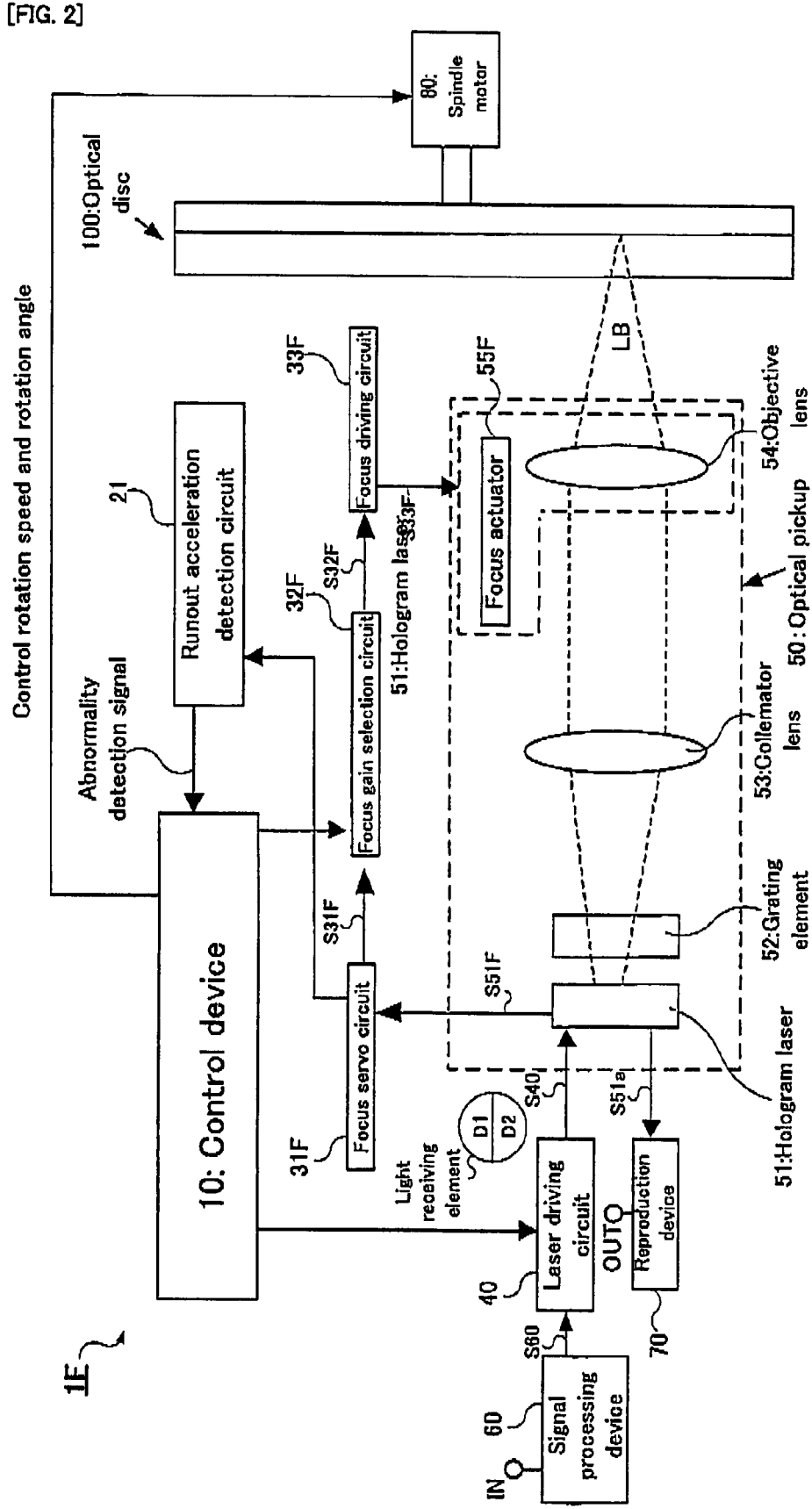
[FIG. 2]

[FIG. 3]
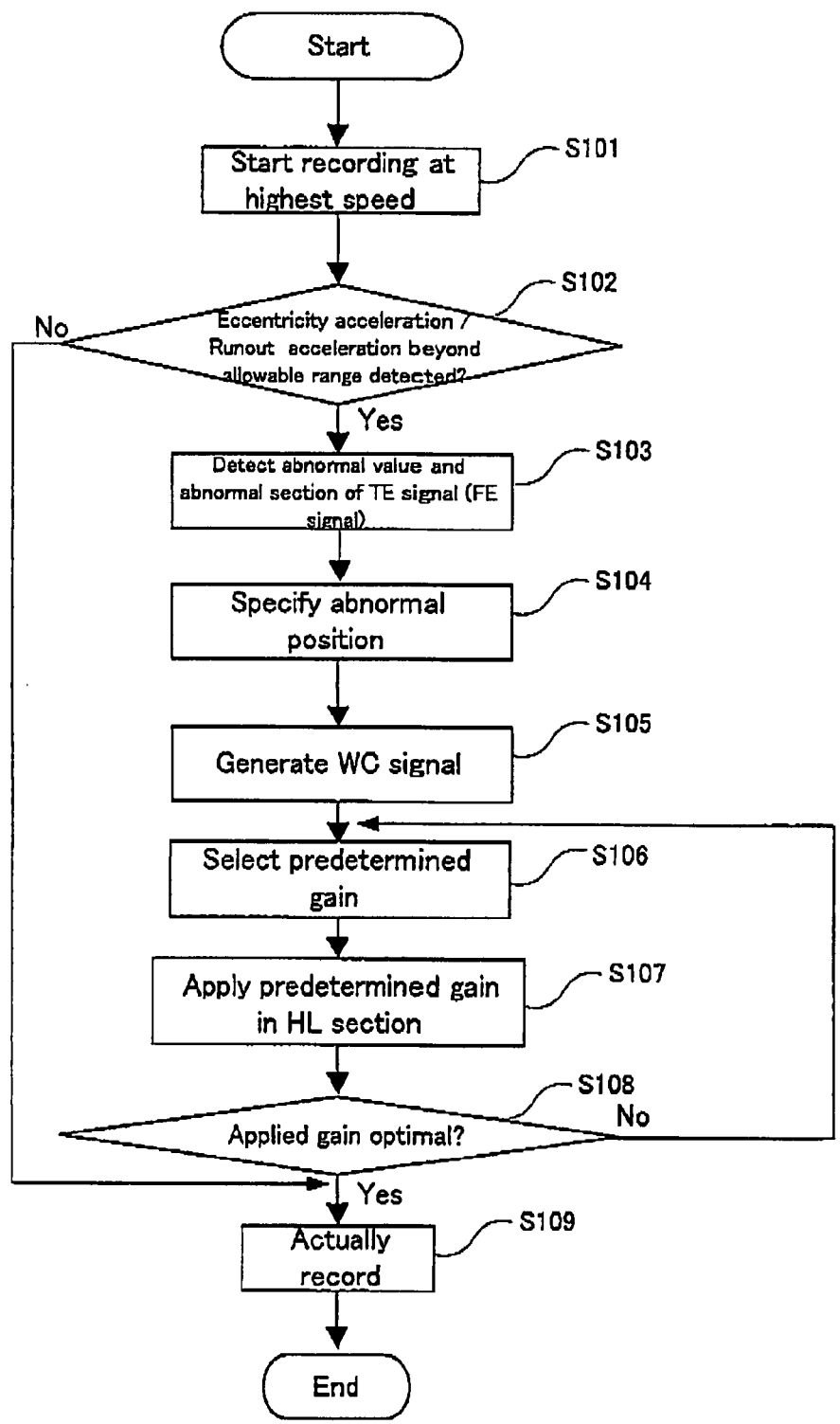

[FIG. 4]
(a) Tracking error signal (Focus error signal) in servo open state
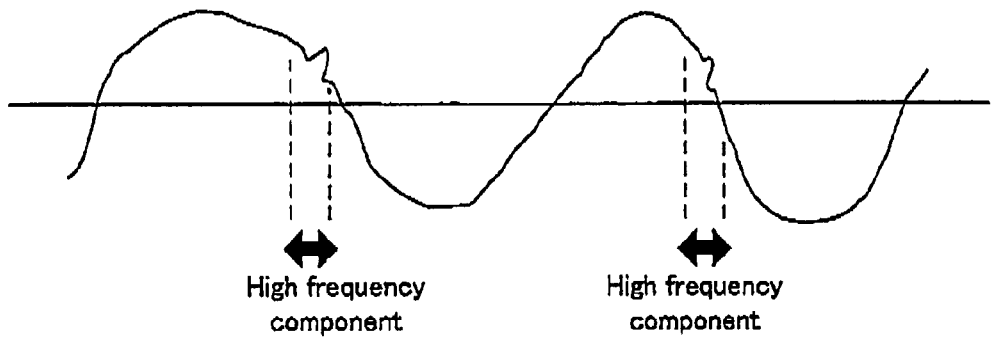
(b) Tracking error signal (Focus error signal) in servo close state
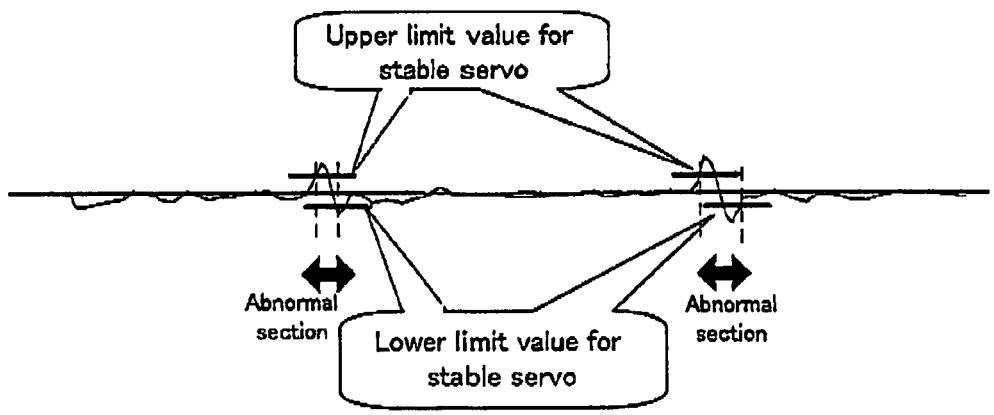
(c) Generate wind comparator signal
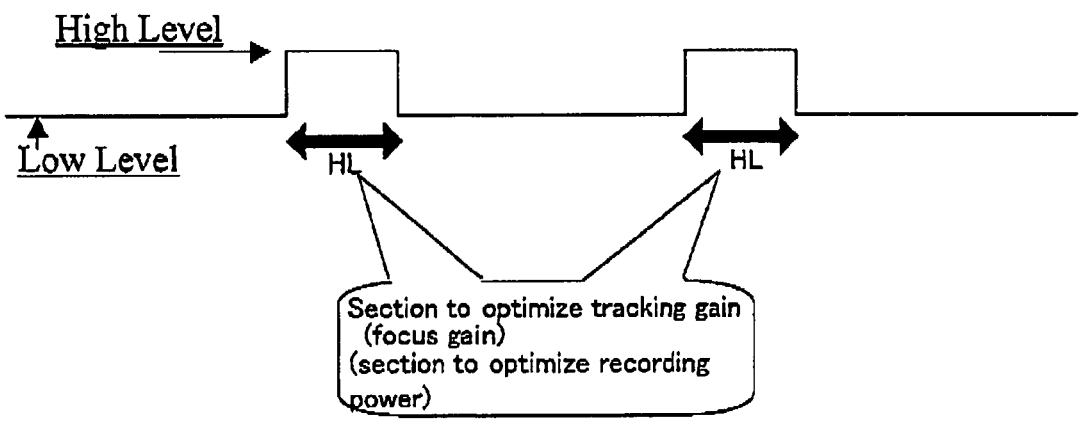

[FIG. 5]
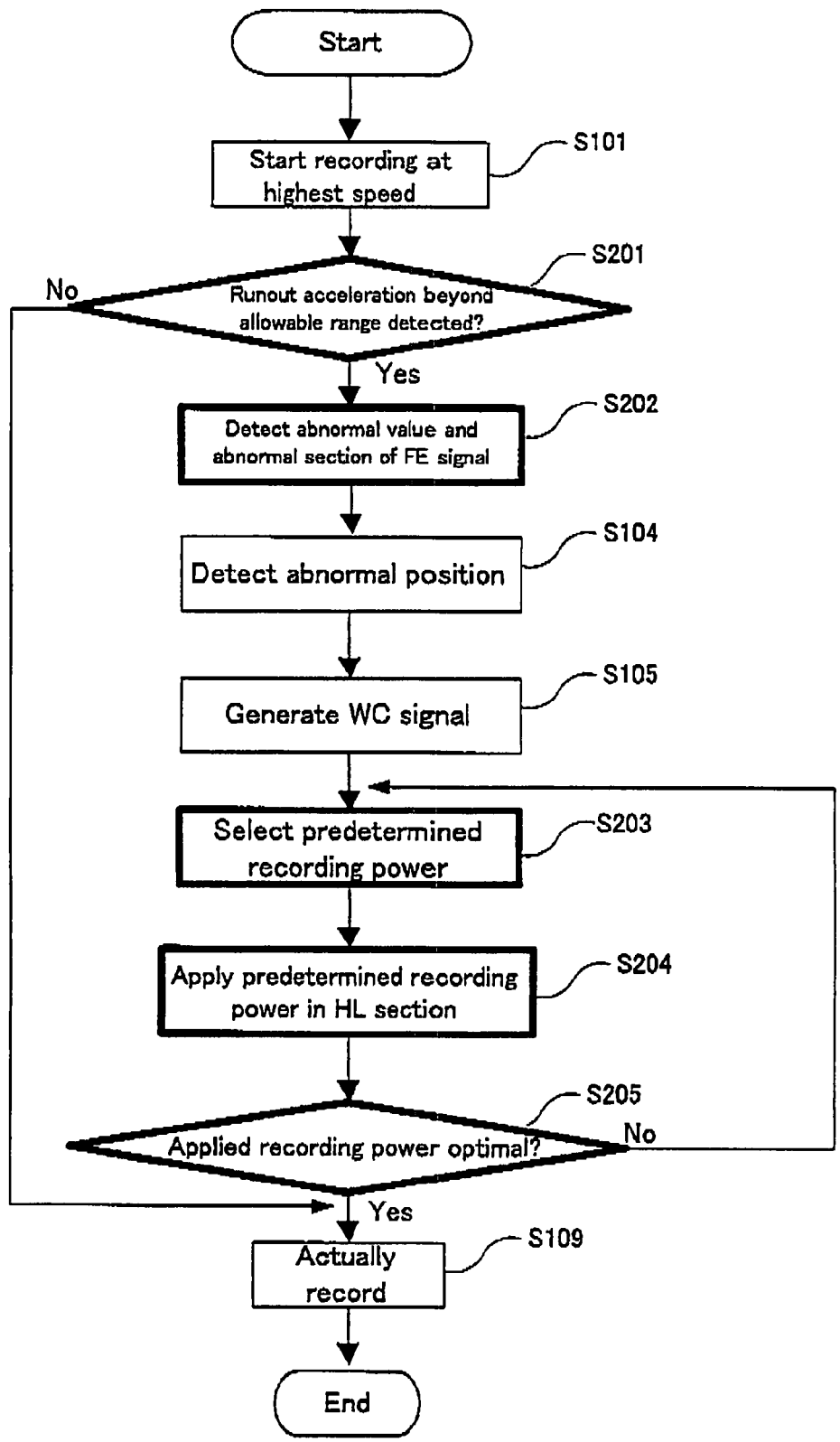

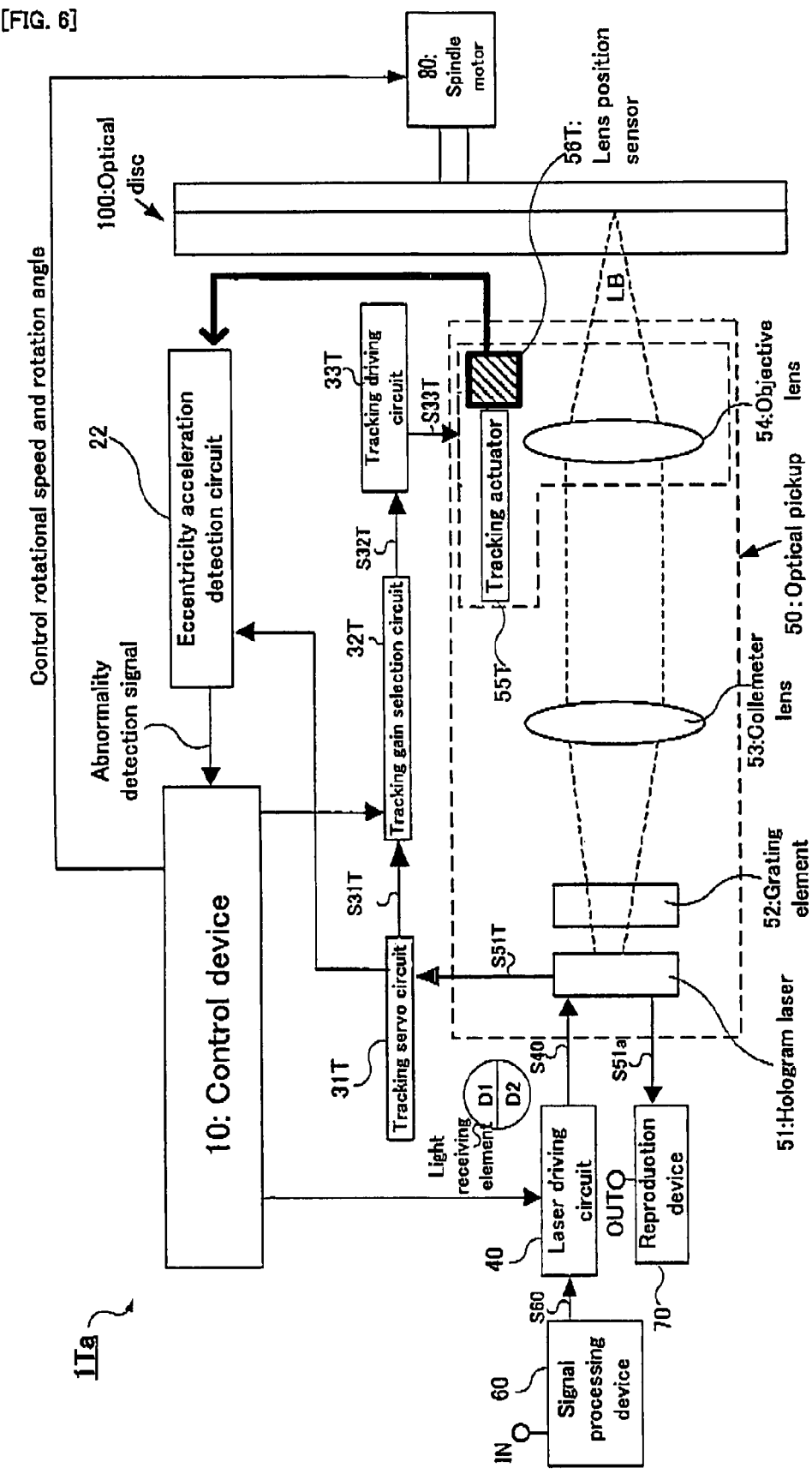
[FIG. 6]

[FIG. 7]
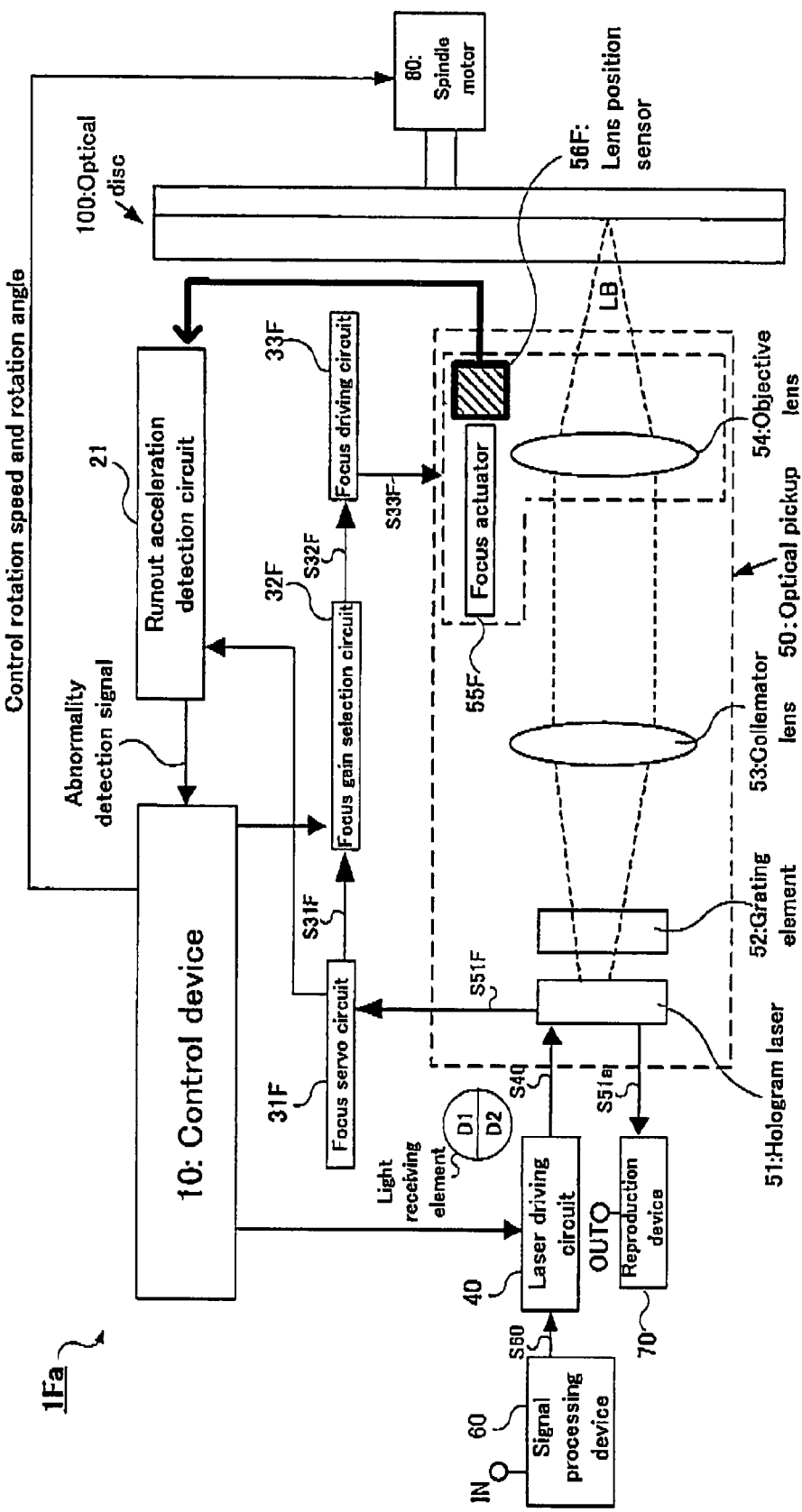

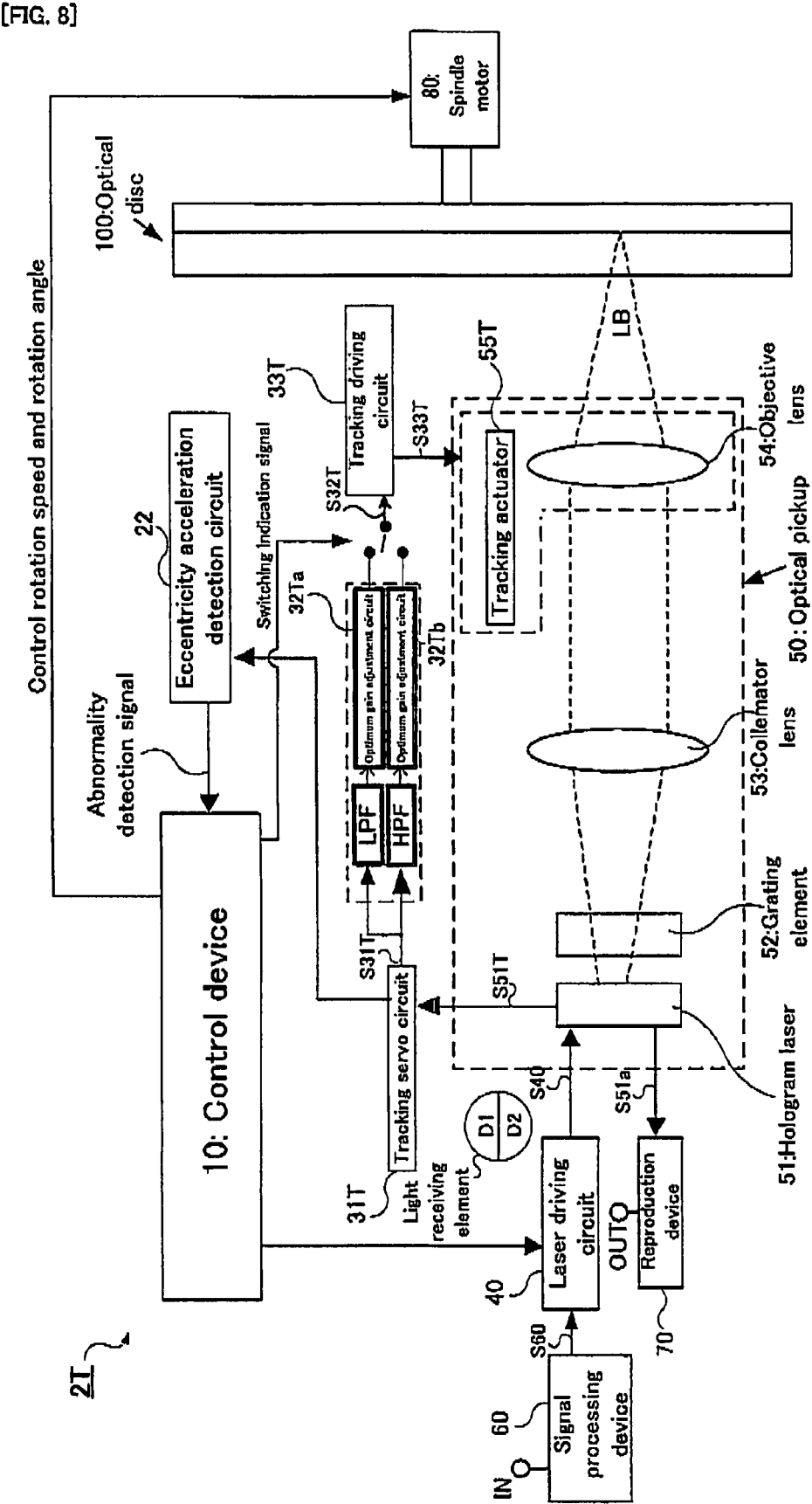
[FIG. 8]

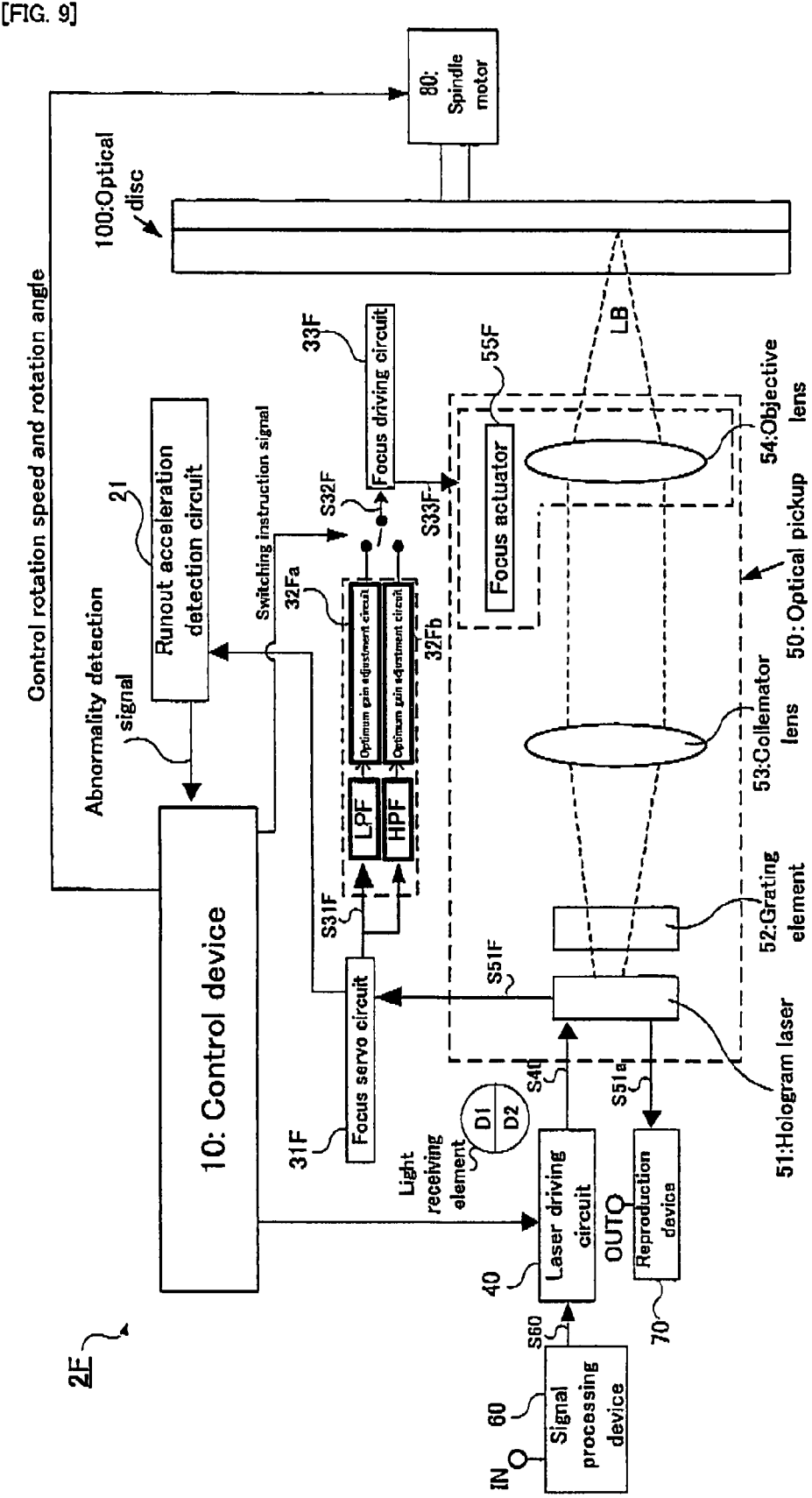
[FIG. 9]

[FIG. 10]
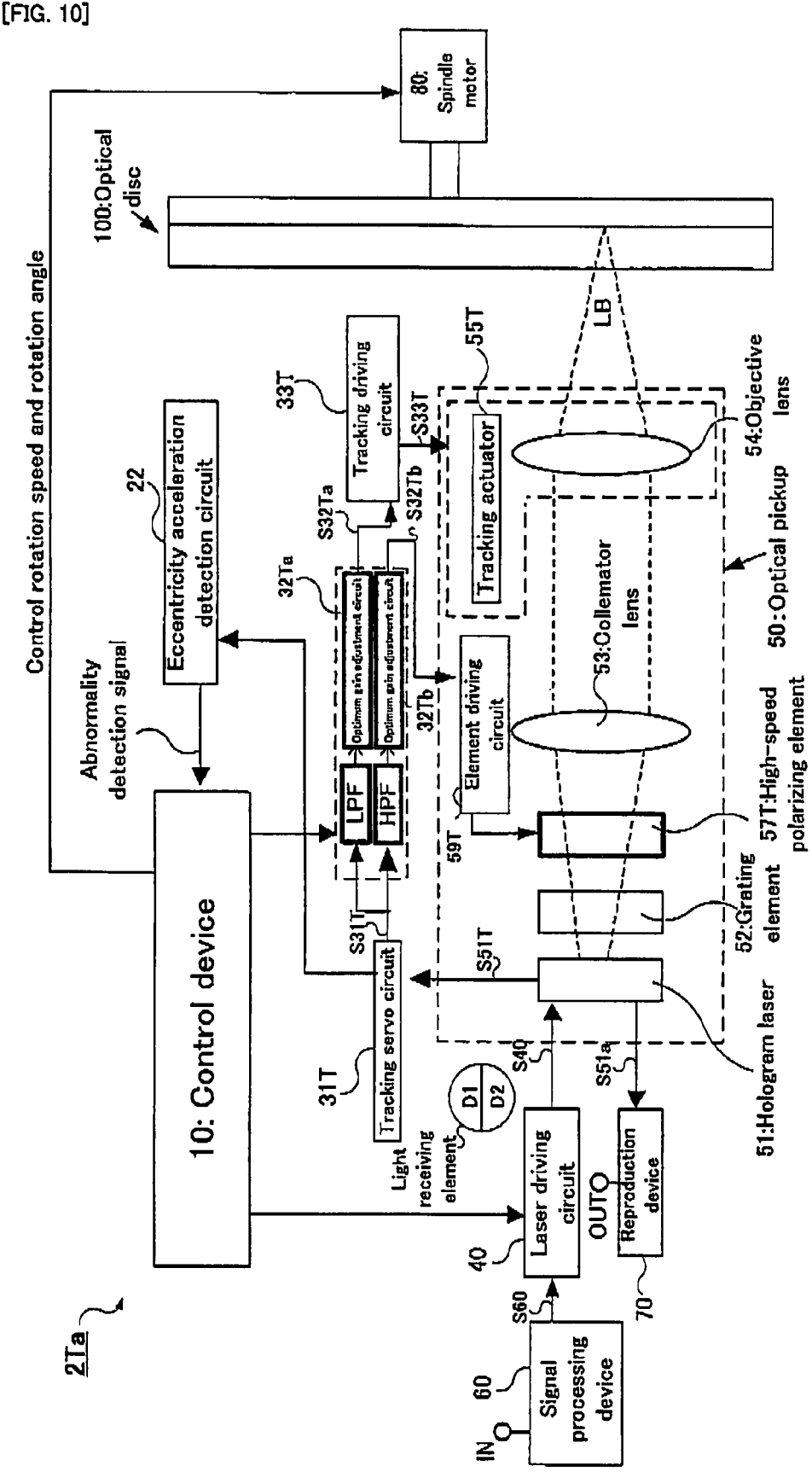

[FIG. 11]
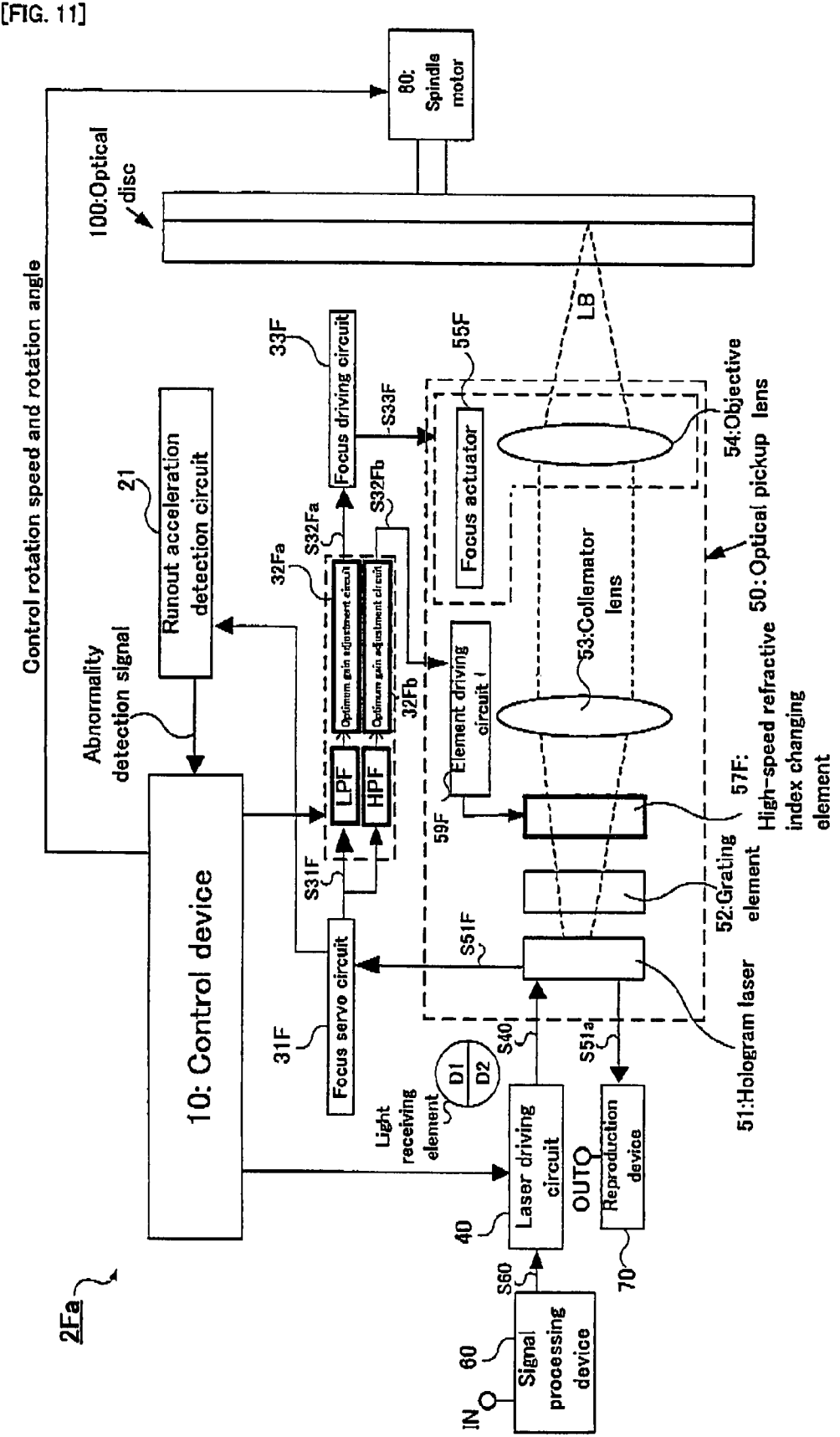

[FIG. 12]
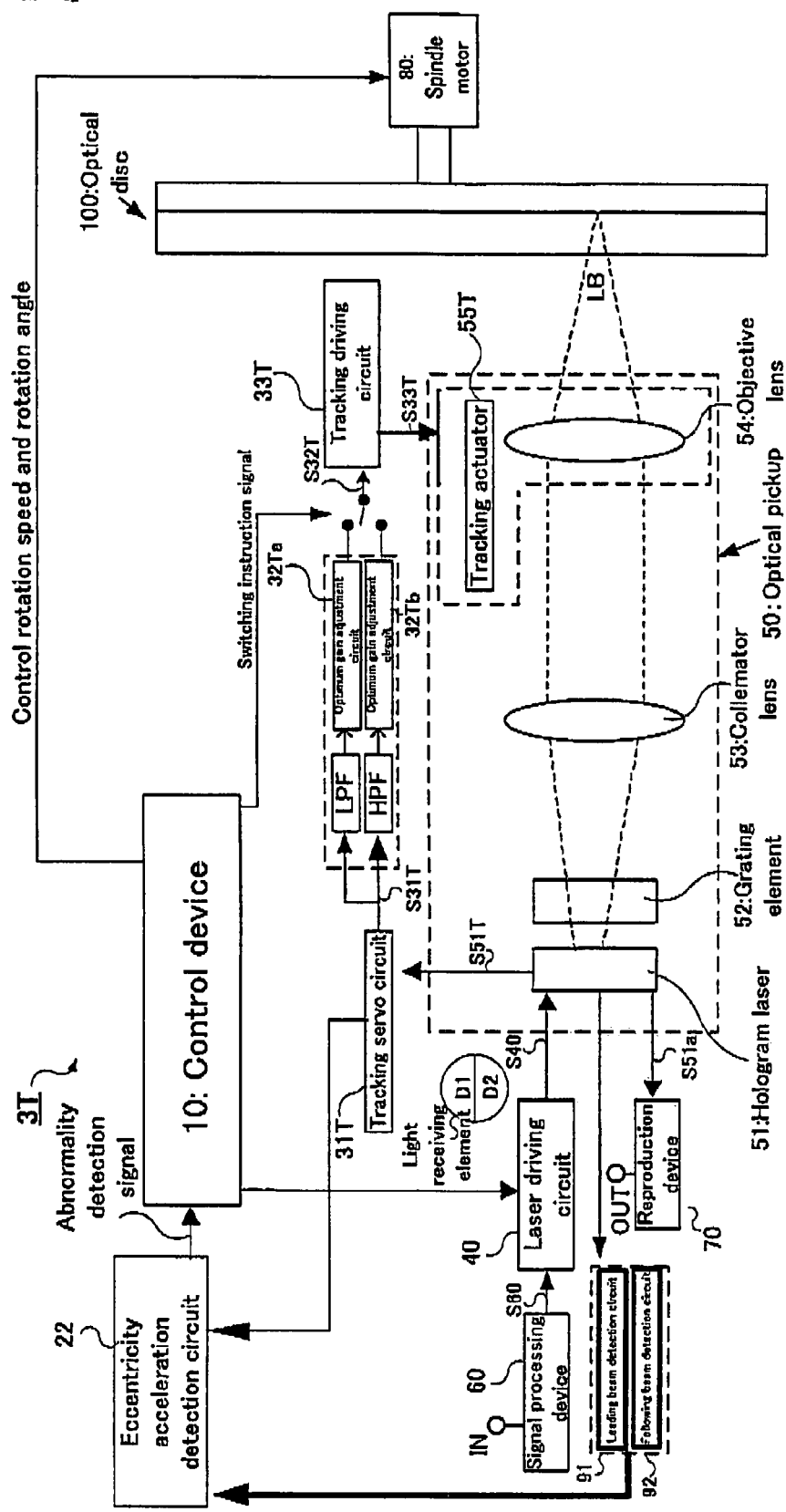

[FIG. 13]
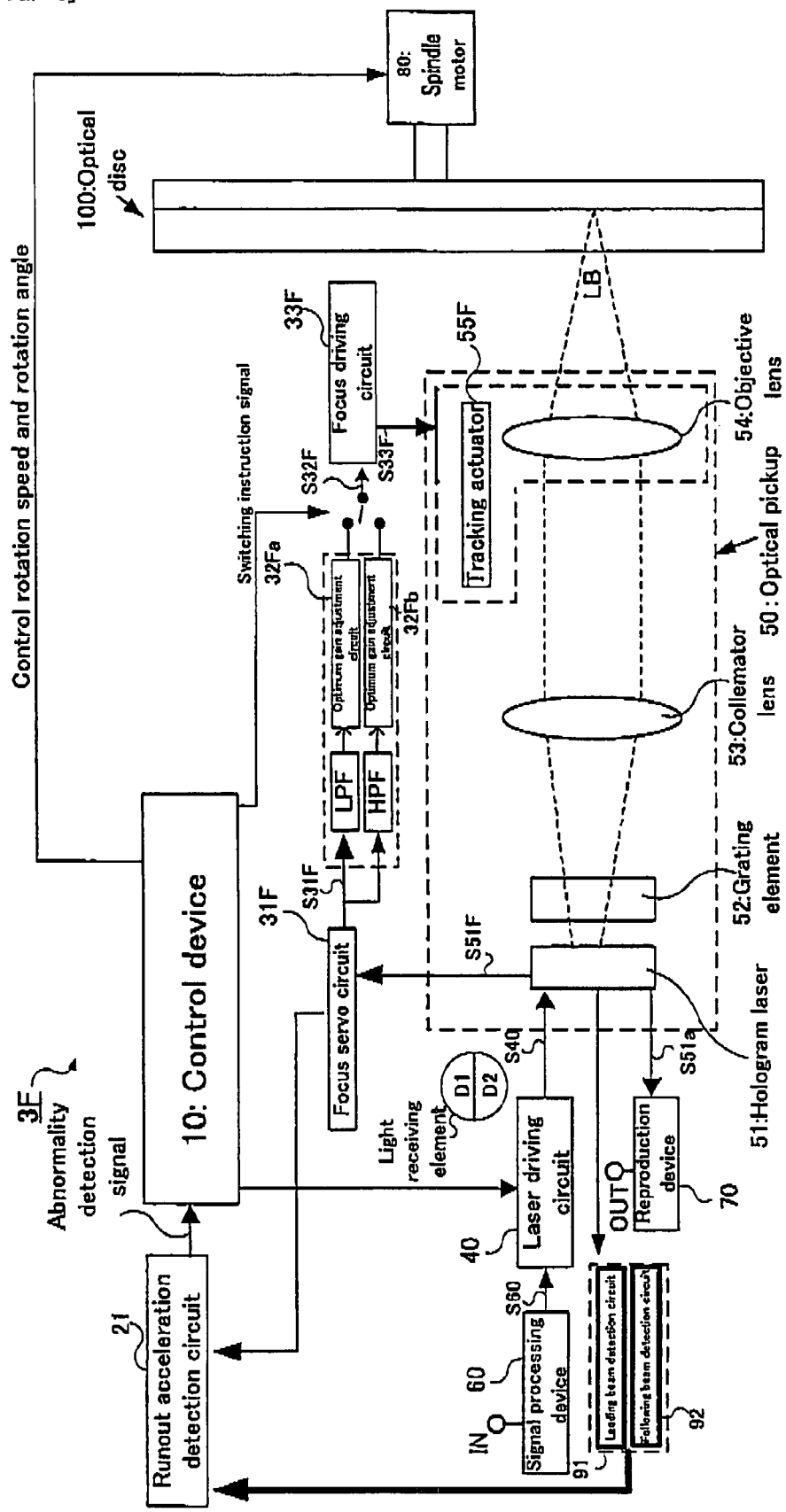

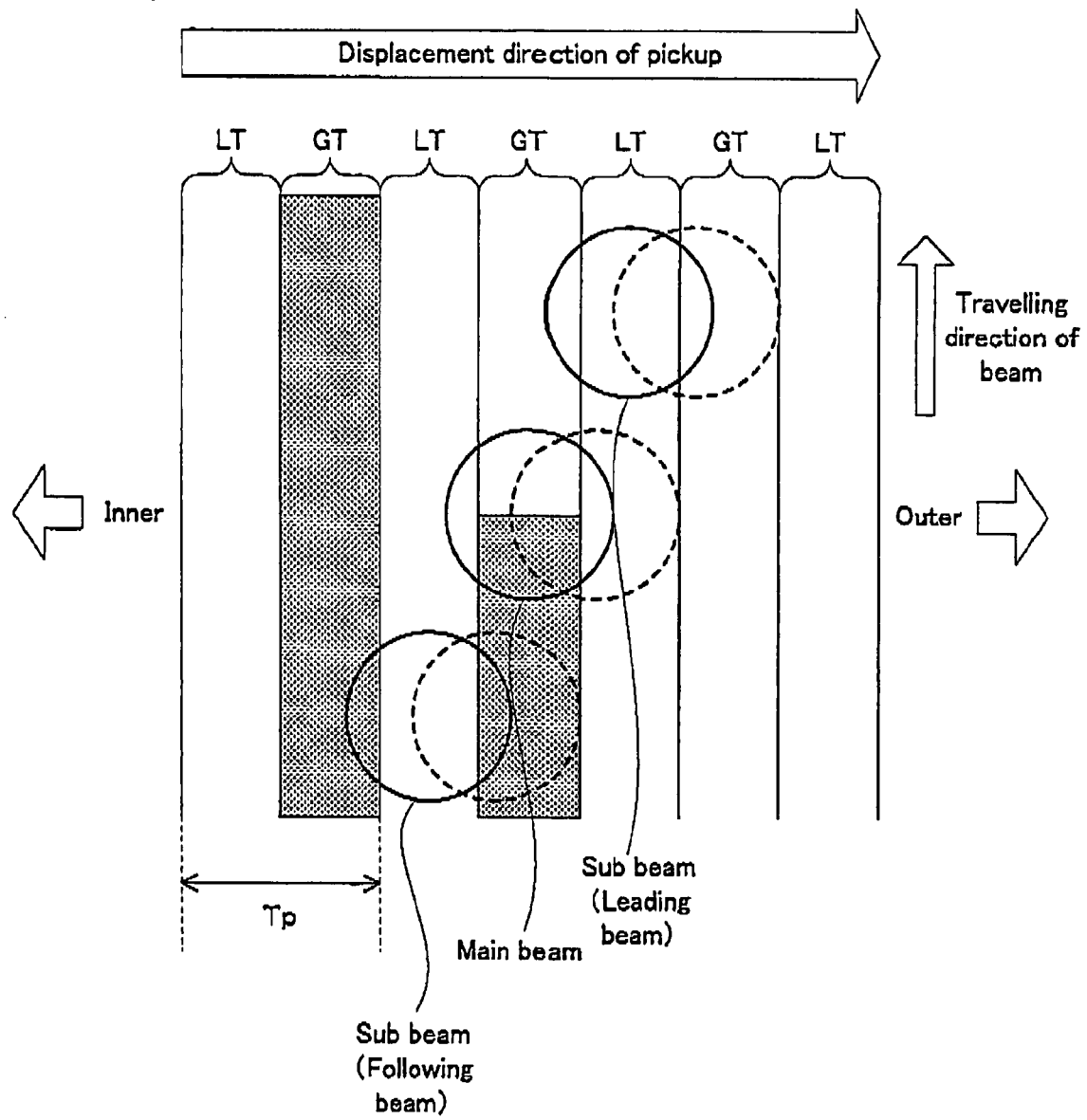

[FIG. 15]
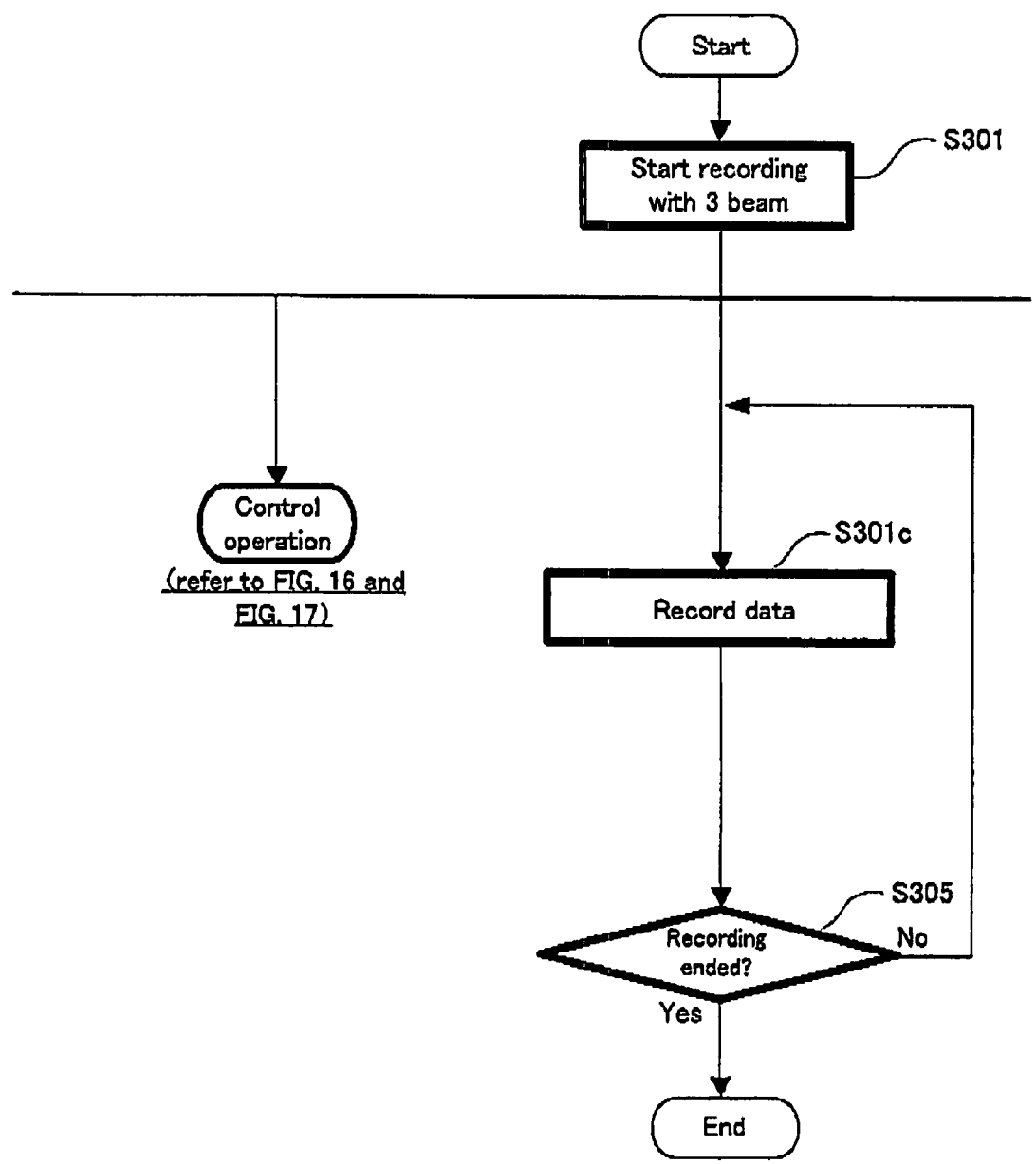

[FIG. 16]
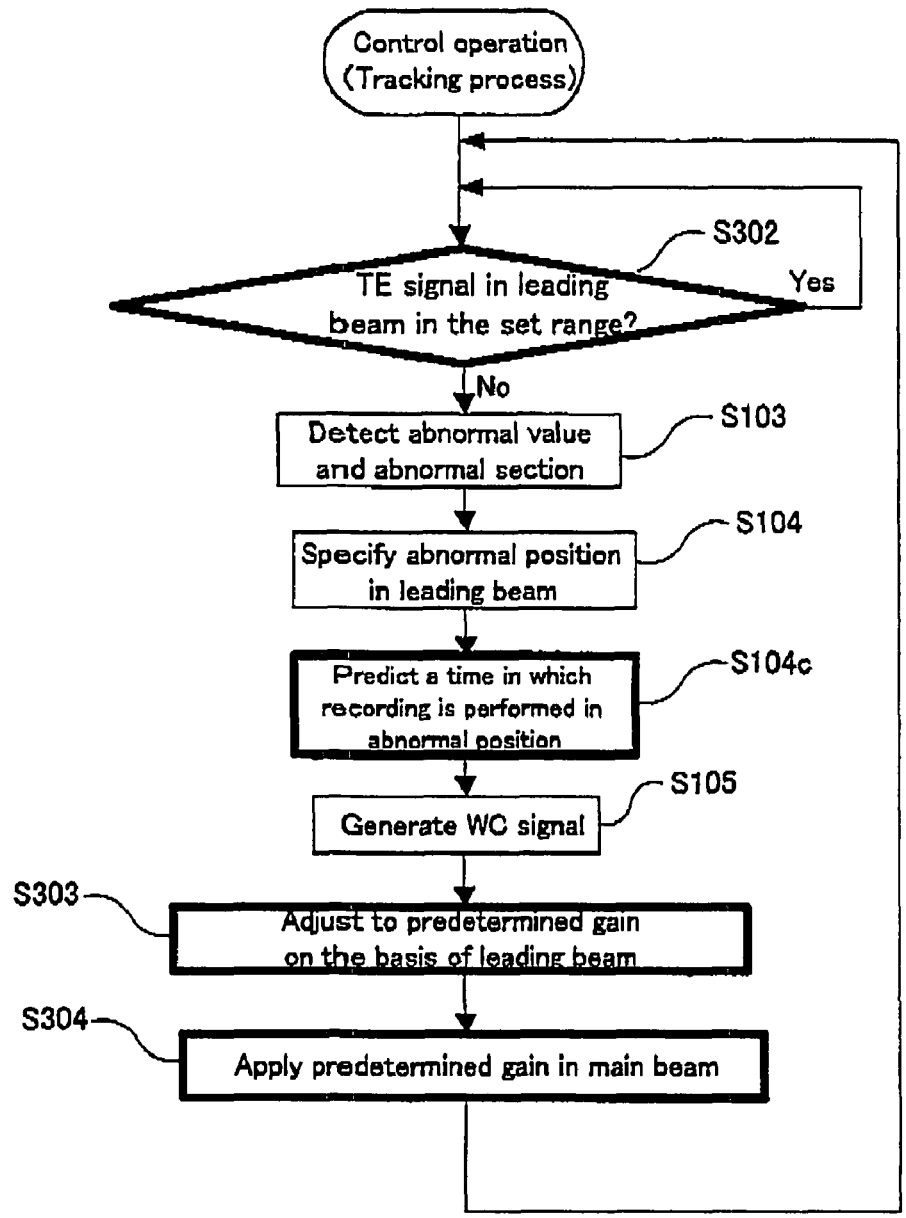

[FIG. 17]
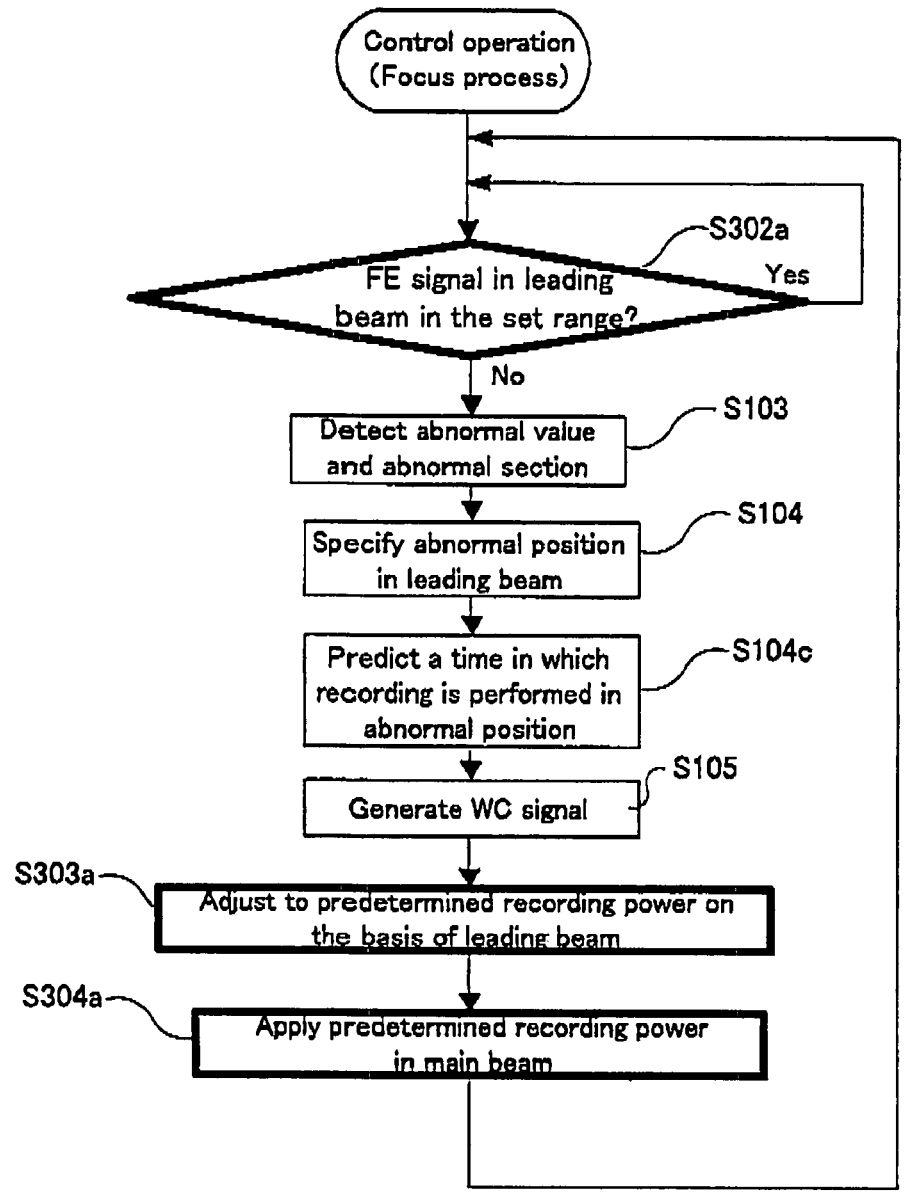

[FIG. 18]
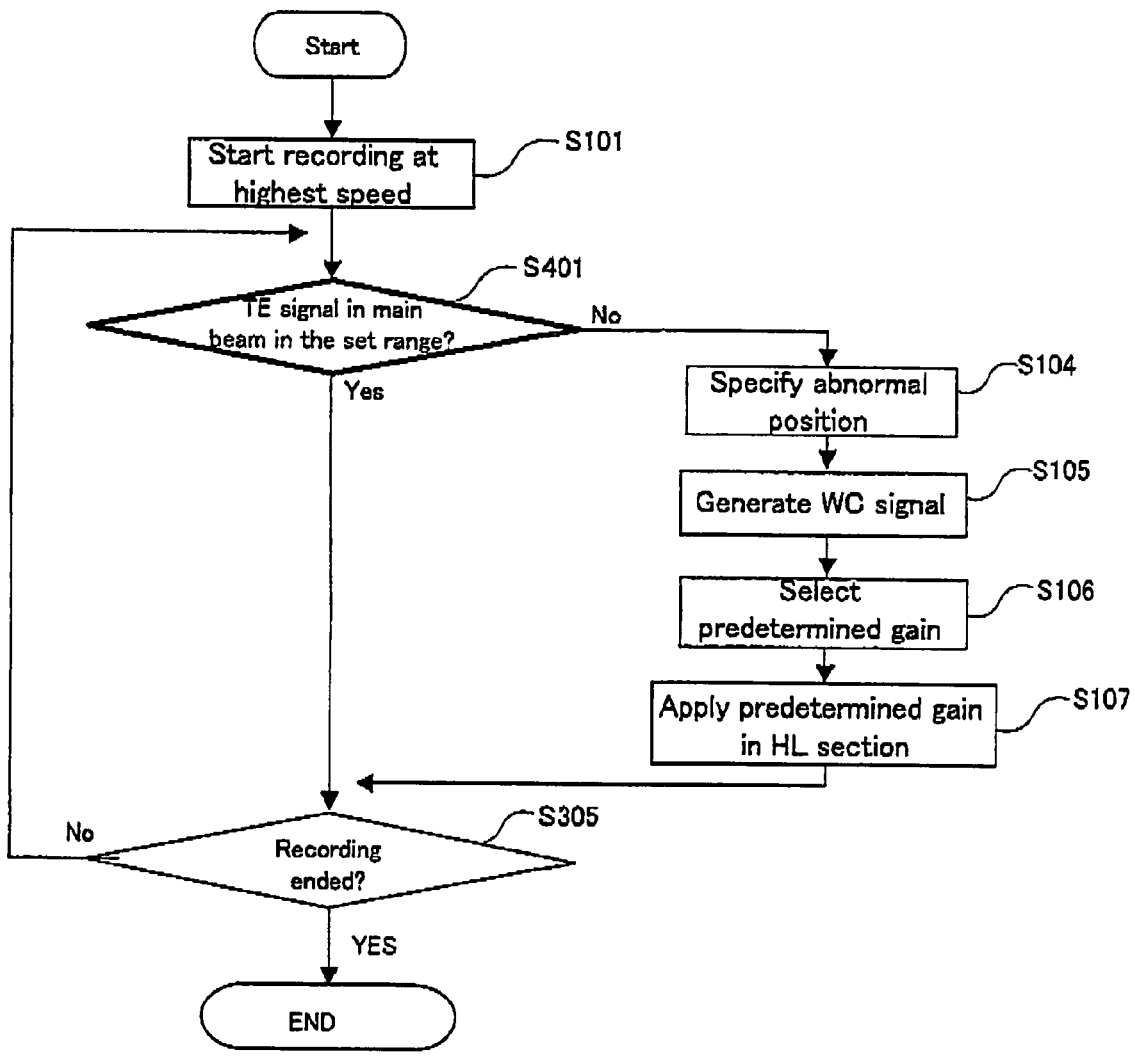

[FIG. 19]
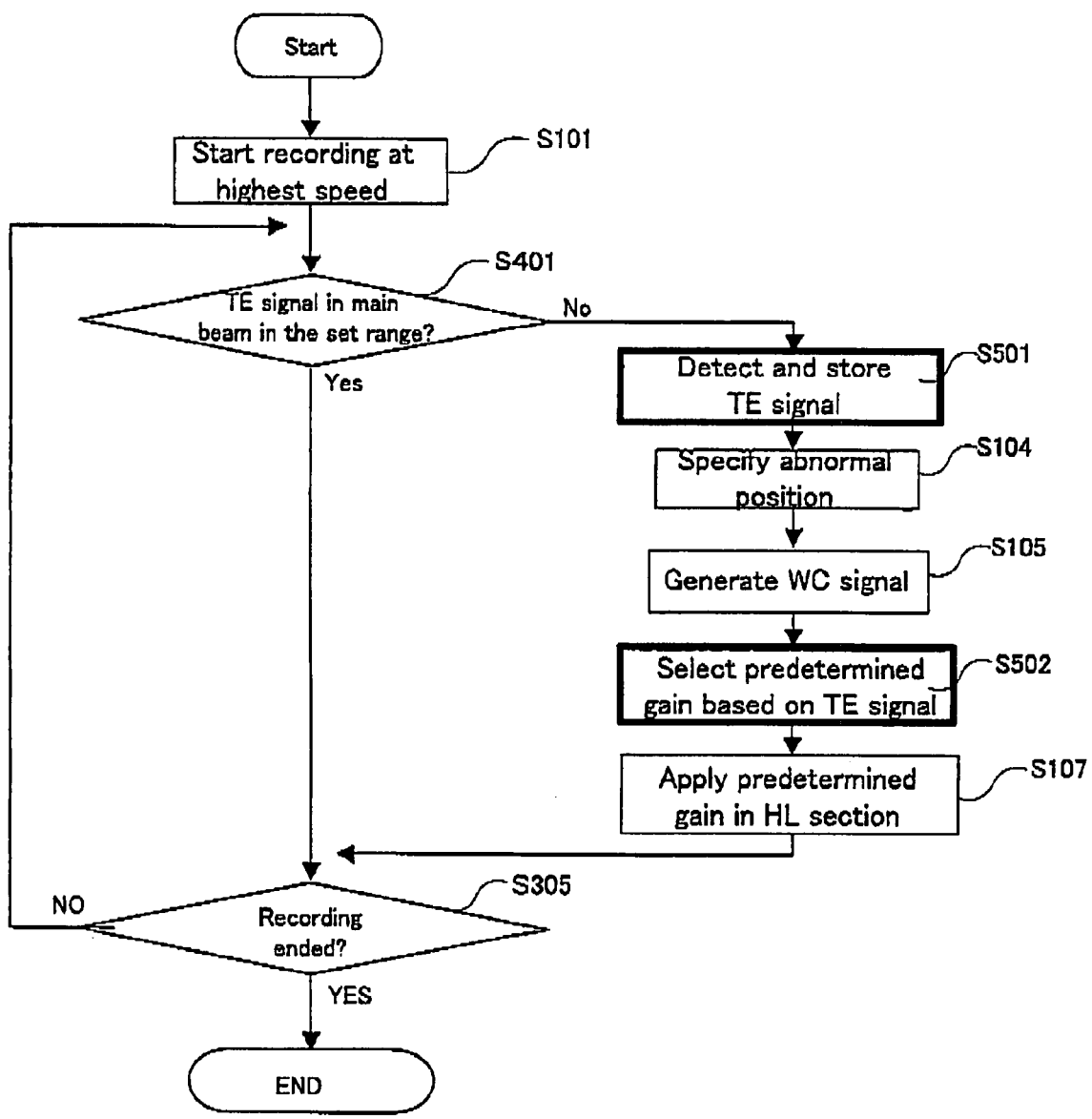

[FIG. 20]
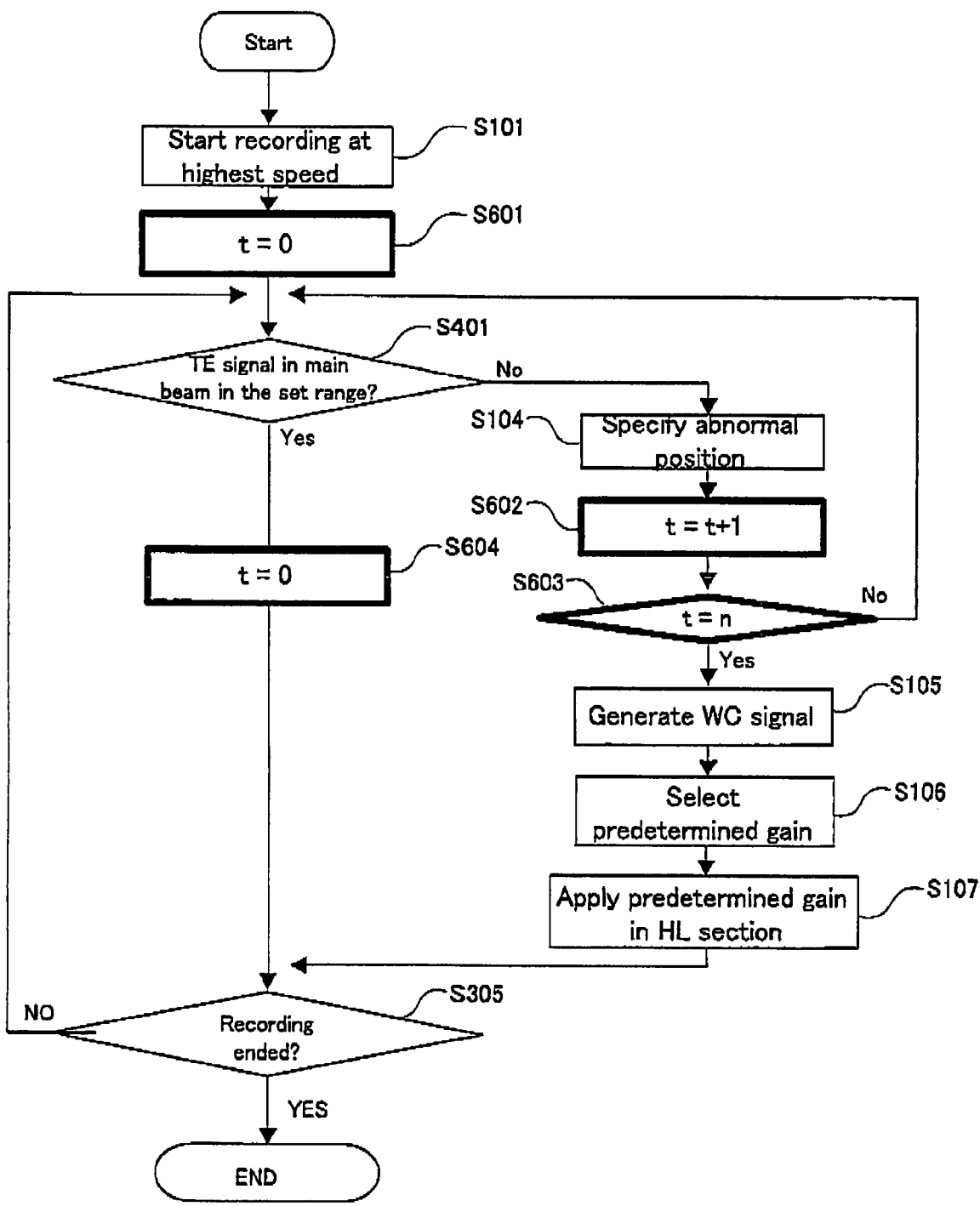

[FIG. 21]
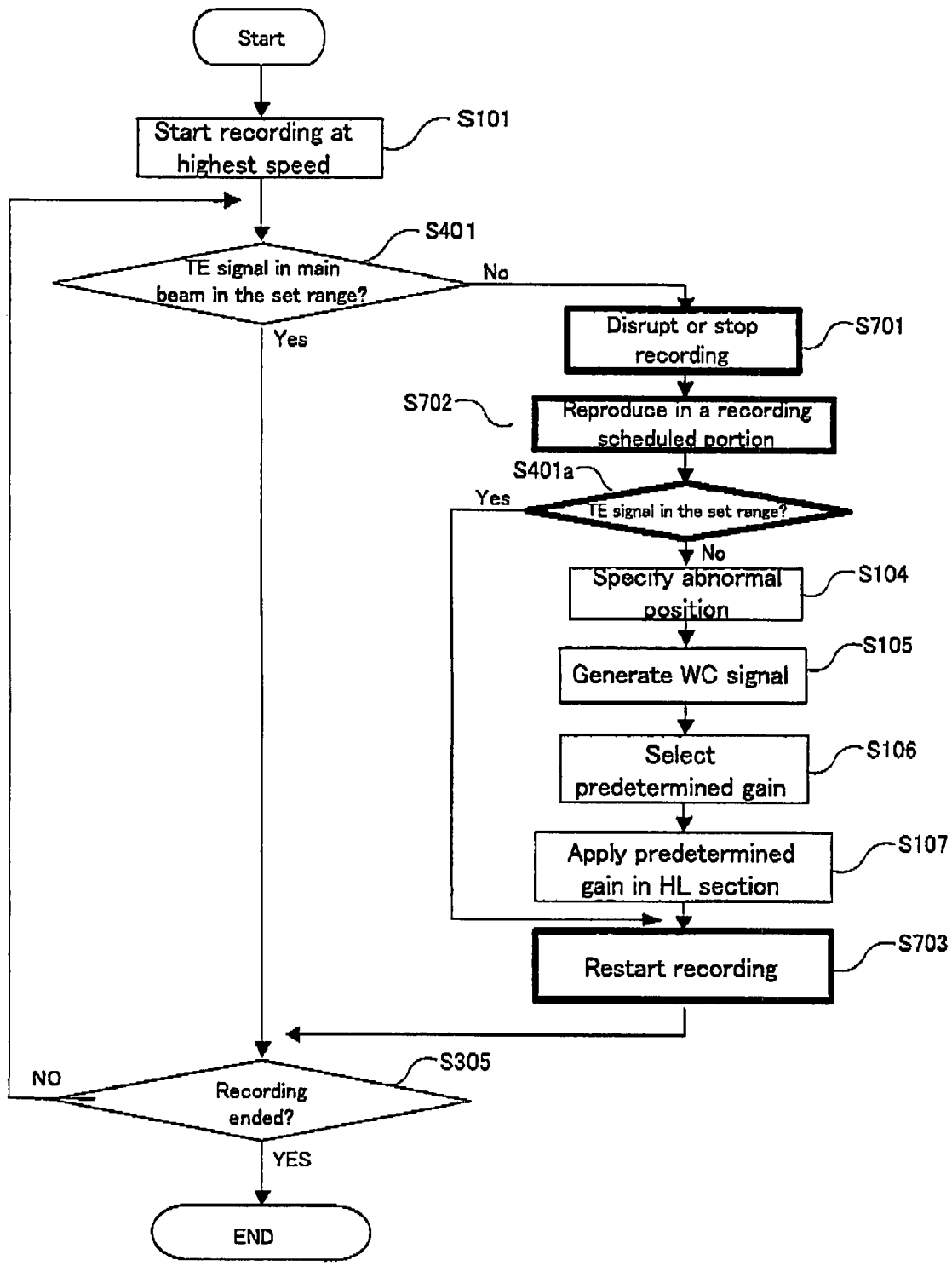

[FIG. 22]
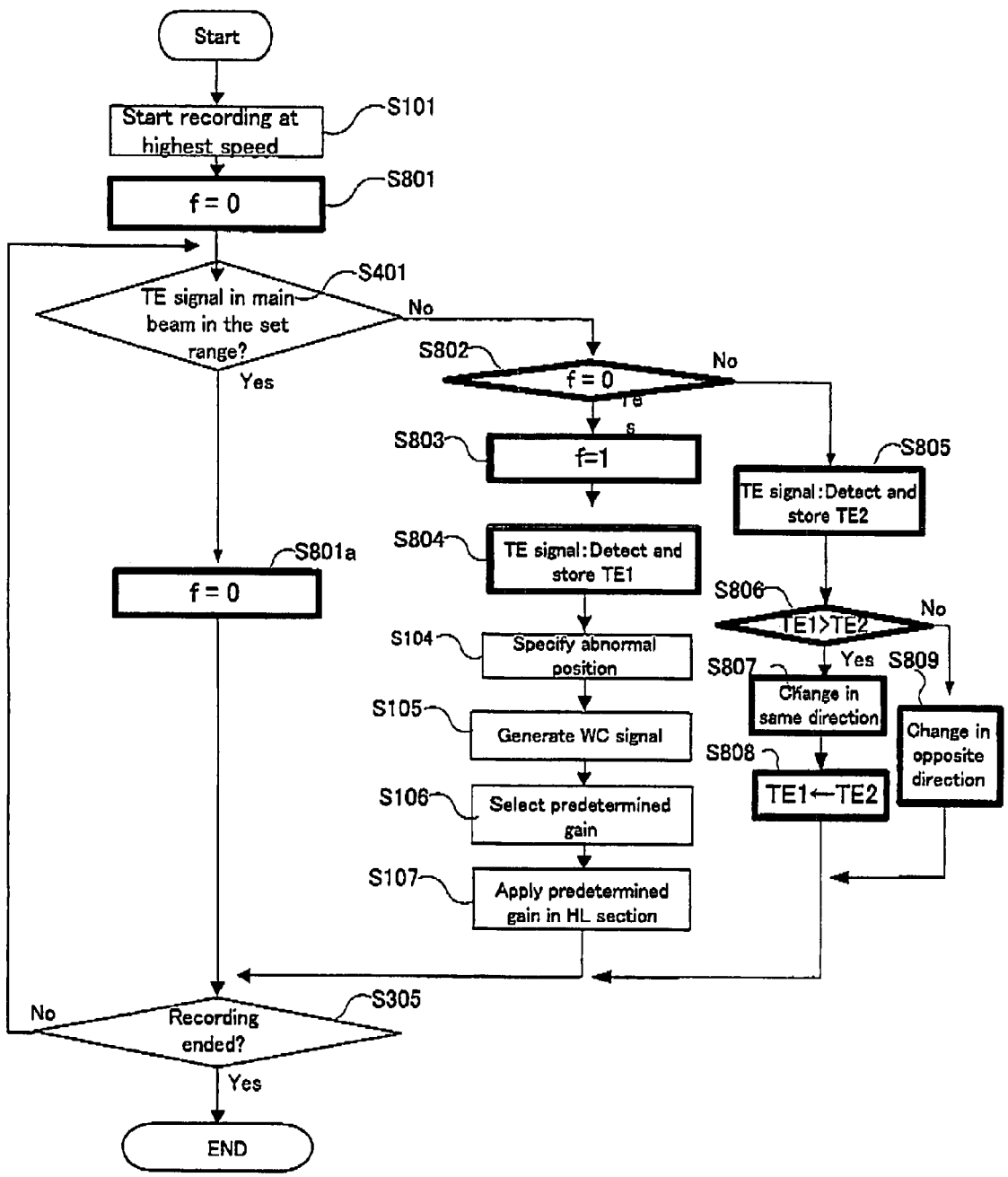

[FIG. 23]
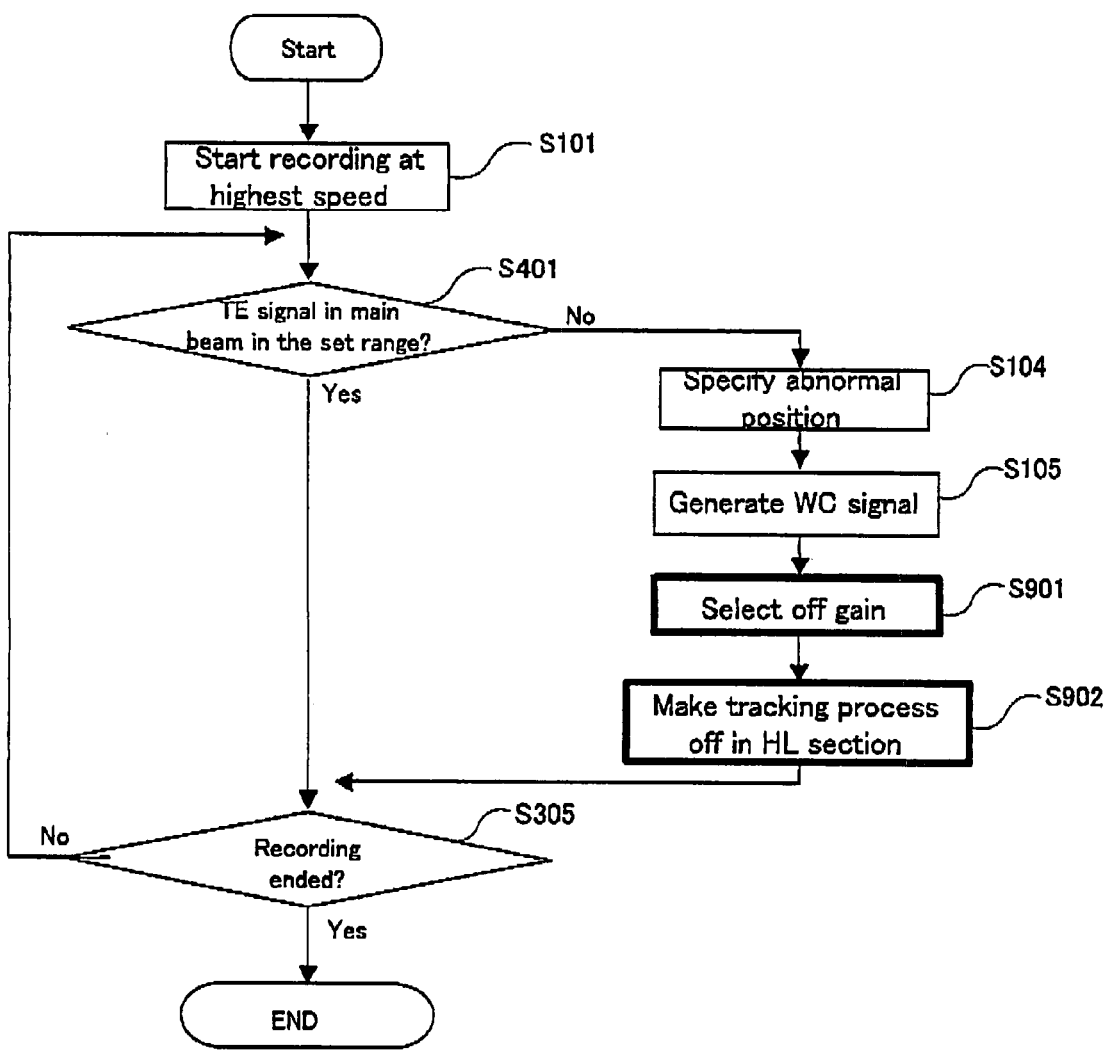

US 7,859,965 B2

RECORDING DEVICE AND METHOD, REPRODUCING DEVICE AND METHOD, RECORDING/REPRODUCING DEVICE AND METHOD, AND COMPUTER PROGRAM

TECHNICAL FIELD

The present invention relates to a recording apparatus and method, such as a DVD recorder, for recording data onto a recording medium, such as a DVD and a CD (Compact Disc), a reproducing apparatus and method for reproducing the data from the recording medium, a recording/reproducing apparatus and method, which can perform both the recording and the reproduction, and a computer program for recording control or reproduction control.

BACKGROUND ART

A patent document 1 discloses a technology regarding a recording or reproducing method of stably performing focus control (or focus process, focus automatic control, focus servo, focusing process) and tracking control (or tracking process, tracking automatic control, tracking servo) when recording or reproduction is performed at high speed with respect to a recording medium, such as a DVD. Specifically, firstly, the property of the recording medium is detected from a high-frequency component included in a focus error signal, which is used for the focus process, or a tracking error signal, which is used for the tracking process. The "property" in the present invention may mean (i) a physical and mechanical property caused by the shape, structure, or the like of the recording medium, such as eccentric acceleration and runout acceleration, or (ii) a chemical or natural property corresponding to the state of a recording surface, such as scratches, dusts, finger prints, and grease. Incidentally, one of the reasons that the property is generated is a change in shape of a groove. The fact that an area with the groove partially changed is generated, as described above, is generally caused by that the shape of a stampa is not properly transferred if an injection molding device is suddenly cooled in a manufacturing process. Then, if the state that the acceleration exceeds a predetermined threshold value is continued at predetermined frequency, the rotational speed (and furthermore, linear recording speed) of the recording medium is reduced, and thus the focus process and the tracking process are stably performed.

More specifically, as one specific example of the tracking process, as disclosed in a non-patent document 1, there is invented a three-beam tracking process in a DPP (Differential push-pull) method. The "three-beam tracking process" in the present invention is a technology in which laser light emitted from an optical pickup is made enter diffraction grating, to thereby generate (i) a main beam, which is mainly used for recording data (or information), and (ii) two sub beams, which are mainly used for the tracking process, and in which the two sub beams are used to perform the tracking process. More specifically, for example, the spots of the sub beams are shifted by half of a track pitch, compared with the spot of the main beam, on the recording surface of a single layer type optical disc. The reflected light of the two sub beams are received by a photodetector or the like which is divided into two. The tracking process is performed by detecting a difference in the amount of light (or phase) which is received in each division of the two-divided photodetector or the like.

On the other hand, even a recording apparatus, such as a general disc drive, is provided with a sensor for detecting oscillation or vibration, and if the detected oscillation amount becomes greater than a predetermined amount, the rotational speed is controlled to be reduced.

Patent document 1: Japanese Patent Application Laid Open NO. 2004-62945

Patent document 2: Japanese Patent Application Laid Open No. 2003-312146

Patent document 3: Japanese Patent Application Laid Open NO. 2002-373419

Non-Patent document 1: "optical head for magneto-optical disk", Electronic Materials, Kogyo Chosakai Publishing, published on Jul. 1, 1988, vol. 27, no. 7, p 73-74

DISCLOSURE OF INVENTION

Subject to be Solved by the Invention

On the recording apparatus, however, there is such a technical problem that although it has an ability of high-speed recording, such as 16-time speed, if a value which indicates the property of the recording medium is away from an allowable range, i.e. if the property is not appropriate, the high-speed recording is technically difficult. In other words, there is such a technical problem that although the recording apparatus, which can perform the high-speed recording, can perform higher-speed recording if performing the recording onto a recording medium which holds the property that allows the high-speed recording, the possibility is not realized.

In the same manner, in a recording film (or recording layer) of the recording medium, there is such a problem that even if it holds a recording-film property (or recording property, recording-layer property) which allows the high-speed recording, if the property of the recording medium is not appropriate, the high-speed recording is technically difficult. In other words, there is such a technical problem that although the recording apparatus, which can perform the high-speed recording, can perform higher-speed recording if performing the recording onto a recording medium which holds the property that allows the high-speed recording, in addition to the recording property which allows the high-speed recording, the possibility is not realized.

In view of the aforementioned conventional problems, it is therefore an object of the present invention to provide a recording apparatus and method, a reproducing apparatus and method, a recording/reproducing apparatus and method, and a computer program for recording control or reproduction control, which can further reduce an influence of variations in the property of the recording surface of a single individual of the recording medium, such as an optical disc, or variations in the property of each individual of the recording medium.

Means for Solving the Subject (Recording Apparatus)

Hereinafter, the recording apparatus of the present invention will be discussed.

The above object of the present invention can be achieved by a recording apparatus provided with: a recording device (e.g., optical pickup, laser driving circuit) for recording data by irradiating laser light onto a disc-shaped recording medium; a driving device (e.g., driving circuit, actuator, objective lens) for performing at least one of tracking control and focus control, in the recording; a servo device for performing automatic control on the driving device, on the basis of an error signal in the at least one of the tracking control and the focus control; a specifying device (e.g., detection circuit)

for specifying an area in which a property (or eccentricity, runout, state of a recording surface, such as scratches or dust) of the recording medium is not good, on the basis of a high-frequency component included in the error signal in the at least one of the tracking control and the focus control; and a controlling device (e.g., CPU: Central Processing Unit) for (i) controlling the servo device to change a control condition (e.g., gain) in the automatic control in addition to or instead of (ii) controlling the recording device to change a recording condition of the laser light, in the specified area.

According to the recording apparatus of the present invention, firstly, by virtue of the specifying device (e.g., detection circuit), the area in which the property (e.g., eccentricity, runout, state of a recording surface, such as scratches and dust) of the recording medium is not good, is specified, on the basis of the high-frequency component included in the error signal in the tracking control or the focus control.

Then, under the control of the controlling device, the control condition or the recording condition (such as a recording power), is changed such that reproduction quality is optimal, in the specified area. There, the "control condition" in the present invention means various factors which can determine performances and characteristics in the control operation, such as the gain in the automatic control (servo).

Therefore, it is possible to record the data, on the basis of a high recording speed held by the recording apparatus as a function and an ability, even onto the recording medium (i) in which, conventionally, the data cannot be recorded at high speed and (ii) in which the data is used to be recorded at low speed, because there is the area in which the property is not good.

As a result, it is possible to record the data at higher speed, while reducing (i) an influence of variations of the property in the recording surface of a single individual of the recording medium, such as an optical disc, or (ii) an influence of variations of the property in each individual of the recording medium.

In one aspect of the recording apparatus of the present invention, the specifying device specifies the area, on the basis of at least one of eccentricity acceleration, runout acceleration, and warping acceleration, in a rotation operation of the recording medium, as the property.

According to this aspect, if the value of at least one of the eccentricity acceleration, the runout acceleration, and the warping acceleration, is detected by the specifying device as, e.g., beyond an allowable range on the recording medium, such as an optical disc, the detected area is specified as the area in which the property of the recording medium is not good.

As a result, it is possible to specify the area in which the property of the recording medium is not good, more highly accurately and quickly.

In another aspect of the recording apparatus of the present invention, the specifying device includes at least one of an eccentricity acceleration detecting device for detecting eccentricity acceleration, a runout acceleration detecting device for detecting runout acceleration, and a warping acceleration detecting device for detecting warping acceleration.

According to this aspect, it is possible to specify the area in which the property of the recording medium is not good, more highly accurately and quickly, by using various detecting devices, which are provided with a wind comparator or the like.

In another aspect of the recording apparatus of the present invention, the specifying device specifies the area, on the basis of a comparison between a value of the high-frequency component and a predetermined threshold value.

According to this aspect, it is possible to specify the area in which the property of the recording medium is not good, more highly accurately and quickly, by using the specifying device, which is provided with a wind comparator or the like.

In another aspect of the recording apparatus of the present invention, concentric or spiral recording track for recording the data is formed on the recording medium, and the specifying device specifies the area on the basis of the high-frequency component, which is periodically generated in the recording track.

According to this aspect, it is possible not to deal with the sudden abnormality in the error signal caused by an influence, such as noise, but to deal with the abnormality in the error signal which is periodically generated in a predetermined position (e.g., at a rotation angle from a reference position) on the optical disc. Thus, it is possible to record the data, more quickly and efficiently.

In another aspect of the recording apparatus of the present invention, the controlling device (i) controls the servo device to increase gain in the automatic control from a standard value, as the control condition, and/or (ii) controls the recording device to increase a recording power of the laser light from a standard value, as the recording condition.

According to this aspect, the recording track can be further followed by increasing the gain in an area from the standard value in association with the area, wherein the eccentricity acceleration is increased in the area because of a change in shape (or distortion) of a groove, which is formed in the recording track of the recording medium, such as an optical disc. Thus, the possibility of high-speed recording can be further increased. Here, the "standard value" in the present invention means the recording power or the gain which is set optimal by the automatic control in the area in which the property of the recording medium is good.

On the other hand, the recording power is increased from the standard value, in association with the area in which the runout acceleration is increased because of the runout on the recording medium. By this, it is possible to inhibit the recording power per unit area from decreasing, in an area in which the focus process (or focus serve) cannot be stably performed and thus the beam radius of the laser light irradiated on the recording medium is increased, i.e. in a defocus area.

As a result, it is possible to record the data at higher speed, while reducing an influence of variations in the property of the recording surface of a single individual of the recording medium, such as an optical disc, or the like.

In another aspect of the recording apparatus of the present invention, it is further provided with an obtaining device for obtaining extent of the error signal in the specified area, the controlling device controlling the servo device, on the basis of a table which indicates an optimum value of extent of gain in the automatic control, with a value which indicates the obtained extent of the error signal as a parameter.

According to this aspect, it is possible to determine the control condition, such as the gain to deal with the eccentricity, more quickly, on the basis of the table, under the control of the controlling device.

In another aspect of the recording apparatus of the present invention, it is further provided with an obtaining device for obtaining extent of the error signal in the specified area, the controlling device controlling the recording device, on the basis of a table which indicates an optimum value of extent of a recording power of the laser light, with a value which indicates the obtained extent of the error signal as a parameter.

According to this aspect, it is possible to determine the recording condition, such as the recording power to deal with the runout, more quickly, on the basis of the table, under the control of the controlling device.

In another aspect of the recording apparatus of the present invention, the controlling device controls the servo device (i) to change extent of gain in the automatic control in one direction (or an opposite direction to an increase and decrease direction in which an optimum value is determined immediately before) when a value which indicates extent of the error signal increases and (ii) to change the extent of the gain in another direction (or a same direction as the increase and decrease direction in which the optimum value is determined immediately before) when the value which indicates the extent of the error signal decreases.

According to this aspect, it is possible to determine the control condition, such as the gain to deal with the eccentricity, more highly accurately, on the basis of a change in the error signal on a time axis.

In another aspect of the recording apparatus of the present invention, the controlling device controls the recording device (i) to change extent of a recording power of the laser light in one direction (or an opposite direction to an increase and decrease direction in which an optimum value is determined immediately before) when a value which indicates extent of the error signal increases and (ii) to change the extent of the recording power in another direction (or a same direction as the increase and decrease direction in which the optimum value is determined immediately before) when the value which indicates the extent of the error signal decreases.

According to this aspect, it is possible to determine the recording condition, such as the recording power to deal with the runout, more highly accurately, on the basis of a change in the error signal on a time axis.

In another aspect of the recording apparatus of the present invention, the controlling device controls at least one of the servo device and the recording device, on the basis of position information which indicates a position of the specified area.

According to this aspect, it is possible to record the data at higher speed, such that the area in which the property of the recording medium is not good, which is periodically generated at a certain angle, is adjusted or associated, more quickly and efficiently, on the recording medium.

In an aspect related to the controlling device, the controlling device may control at least one of the servo device and the recording device, in a period or a section which indicates a high-level value included in a wind comparator signal as the position information.

By virtue of such construction, it is possible to specify the area in which the property of the recording medium is not good, more highly accurately, to thereby change the control condition and the recording condition.

In another aspect of the recording apparatus of the present invention, the controlling device further controls the servo device and the recording device to record the data, for a trial use.

According to this aspect, the area in which the property of the recording medium is not good, is specified in the trial data recording, and the control condition and the recording condition are determined in association with the area. On the basis of the specified area and the determined control condition and recording condition, the actual real recording is performed.

As a result, the data can be recorded, more quickly and more highly accurately.

In another aspect of the recording apparatus of the present invention, the controlling device controls the servo device and the recording device (i) to disrupt the recording, (ii) to change at least one of the control condition and the recording condition, and (iii) to restart the recording, in a recording area including the specified area.

According to this aspect, it is possible to once disrupt the recording to change the control condition and the recording condition, to thereby record the data more highly accurately.

In another aspect of the recording apparatus of the present invention, the controlling device controls the servo device and the recording device, on the basis of identification information which indicates whether or not at least one of the control condition and the recording condition is changed.

According to this aspect, by virtue of the controlling device, it is judged whether or not the control condition and the recording condition are further changed, on the basis of the identification information.

As a result, by virtue of the controlling device, it is possible to change the control condition and the recording condition, more highly accurately, to thereby increase the reproduction quality of the recorded data.

In another aspect of the recording apparatus of the present invention, the controlling device controls the servo device not to operate the automatic control in the specified area.

According to this aspect, the more simple automatic control is performed in the area in which the property is not good, so that it is possible to further increase the possibility of the high-speed data recording.

In an aspect related to the controlling device, the controlling device may control the servo device not to operate the automatic control, on the basis of an equation or a table which indicates a predetermined relationship.

By virtue of such construction, it is possible to put restrictions not to generate e.g. detrack, on the basis of the equation or the table which indicates the predetermined relationship. Thus, it is possible to realize the high-speed recording, more stably.

In another aspect of the recording apparatus of the present invention, the recording device includes a diffracting device for diffracting the laser light, the diffracting device generates (i) a main beam which is used to perform at least one process of the recording of the data, reproduction of the data, the tracking control, and the focus control and (ii) at least two sub beams which are used to perform said one process, the recording device (or optical pickup, laser driving circuit) records the data by irradiating the laser light included in at least one of the main beam and the sub beams, and the controlling device controls the recording device, on the basis of the high-frequency component.

According to this aspect, for example, by using a leading beam in a three-beam tracking process, it is possible to detect the area in which the property is not good, more quickly than the case of the main beam that actually performs the recording, by a time length corresponding to one rotation of the recording medium, by using the high-frequency component included in the error signal beyond the allowable range detected. Therefore, it is possible to perform the recording based on the tracking process (or focus process) to which the optimum control condition is applied, in the main beam, and it is also possible to record the data at high speed with the recording condition which is optimal in real time.

In another aspect of the recording apparatus of the present invention, it is further provided with at least one of a polarizing element for changing a polarization direction of the laser light and a refractive-index changing element for changing a refractive index of the laser light, the controlling device further controlling the polarizing element to change the polarization direction of the laser light at high speed, in the specified area, or controlling the refractive-index changing element to change the refractive index of the laser light at high speed, in the specified area.

According to this aspect, under the control of the controlling device, in addition to that the control condition and the recording condition are changed on the recording device, the polarization direction or the refractive index of the laser light is changed at high speed. Therefore, it is possible to record the data at higher speed, while reducing an influence of variations of the property in the recording surface of a single individual of the recording medium, such as an optical disc, or variations of the property in each individual of the recording medium.

(Reproducing Apparatus)

Hereinafter, the reproducing apparatus of the present invention will be discussed.

The above object of the present invention can be also achieved by reproducing apparatus provided with: a reproducing device (or optical pickup, laser driving circuit) for reproducing data by irradiating laser light onto a disc-shaped recording medium; a driving device (or driving circuit, actuator, objective lens) for performing at least one of tracking control and focus control, in the reproduction; a servo device for performing automatic control on the driving device, on the basis of an error signal in the at least one of the tracking control and the focus control; a specifying device (or detection circuit) for specifying an area in which a property (or eccentricity, runout, state of a recording surface, such as scratches and dust) of the recording medium is not good, on the basis of a high-frequency component included in the error signal in the at least one of the tracking control and the focus control; and a controlling device (or CPU) for (i) controlling the servo device to change a control condition (or gain) in the automatic control in addition to or instead of (ii) controlling the reproducing device to change a reproduction condition of the laser light, in the specified area.

According to the reproducing apparatus of the present invention, as in the aforementioned recording apparatus, the area in which the property (or eccentricity, runout, state of a recording surface, such as scratches and dust) of the recording medium is not good is specified.

Then, under the control of the controlling device, the control condition or the reproduction condition, such as a reproduction power, is changed in the specified area.

Therefore, it is possible to reproduce the data, on the basis of a high reproducing speed held by the reproducing apparatus as a function and an ability, even onto the recording medium in which, conventionally, the data cannot be reproduced at high speed and is used to be reproduced at low speed because there is the area in which the property is not good.

As a result, it is possible to reproduce the data at higher speed, while reducing an influence of variations in the property of the recording surface of a single individual of the recording medium, such as an optical disc, or variations in the property of each individual of the recording medium.

Incidentally, in response to the various aspects of the recording apparatus of the present invention described above, the reproducing apparatus of the present invention can employ various aspects.

(Recording/Reproducing Apparatus)

Hereinafter, the recording/reproducing apparatus of the present invention will be discussed.

The above object of the present invention can be also achieved by a recording/reproducing apparatus provided with: a recording/reproducing device (or optical pickup, laser driving circuit) for recording or reproducing data by irradiating laser light onto a disc-shaped recording medium; a driving device (or driving circuit, actuator, objective lens) for performing at least one of tracking control and focus control, in the recording or the reproduction; a servo device for performing automatic control on the driving device, on the basis of an error signal in the at least one of the tracking control and the focus control; a specifying device (or detection circuit) for specifying an area in which a property (or eccentricity, runout, state of a recording surface, such as scratches and dust) of the recording medium is not good, on the basis of a high-frequency component included in the error signal in the at least one of the tracking control and the focus control; and a controlling device (or CPU) for (i) controlling the servo device to change a control condition (or gain) in the automatic control in addition to or instead of (ii) controlling the recording/reproducing device to change a recording condition or a reproduction condition of the laser light, in the specified area.

According to the recording/reproducing apparatus of the present invention, as in the aforementioned recording apparatus, the area in which the property (or eccentricity, runout) of the recording medium is not good is specified.

Then, under the control of the controlling device, the control condition, the recording condition, or the reproduction condition is changed in the specified area.

Therefore, it is possible to record or reproduce the data, on the basis of a high recording or reproducing speed held by the recording/reproducing apparatus as a function and an ability, even onto the recording medium in which, conventionally, the data cannot be recorded or reproduced at high speed and is used to be recorded or reproduced at low speed because there is the area in which the property is not good.

As a result, it is possible to record or reproduce the data at higher speed, while reducing an influence of variations in the property of the recording surface of a single individual of the recording medium, such as an optical disc, or variations in the property of each individual of the recording medium.

Incidentally, in response to the various aspects of the recording apparatus or reproducing apparatus of the present invention described above, the recording/reproducing apparatus of the present invention can employ various aspects.

(Recording Method)

Hereinafter, the recording method of the present invention will be discussed.

The above object of the present invention can be also achieved by recording method on a recording apparatus provided with: (i) a recording device (or optical pickup, laser driving circuit) for recording data by irradiating laser light onto a disc-shaped recording medium; and (ii) a driving device (or driving circuit, actuator, objective lens) for performing at least one of tracking control and focus control, in the recording, the recording method provided with: a servo process of performing automatic control on the driving device, on the basis of an error signal in the at least one of the tracking control and the focus control; a specifying process of specifying an area in which a property (or eccentricity, runout, state of a recording surface, such as scratches and dust) of the recording medium is not good, on the basis of a high-frequency component included in the error signal in the at least one of the tracking control and the focus control; and a controlling process of (i) controlling the servo device to change a control condition (or gain) in the automatic control in addition to or instead of (ii) controlling the recording device to change a recording condition of the laser light, in the specified area.

According to the recording method of the present invention, it is possible to receive the various benefits of the aforementioned recording apparatus of the present invention.

Incidentally, in response to the various aspects of the recording apparatus of the present invention described above, the recording method of the present invention can employ various aspects.

(Reproducing Method)

Hereinafter, the reproducing method of the present invention will be discussed.

The above object of the present invention can be also achieved by a reproducing method on a reproducing apparatus provided with: (i) a reproducing device (or optical pickup, laser driving circuit) for reproducing data by irradiating laser light onto a disc-shaped recording medium; and (ii) a driving device (or driving circuit, actuator, objective lens) for performing at least one of tracking control and focus control, in the reproduction, the reproducing method provided with: a servo process of performing automatic control on the driving device, on the basis of an error signal in the at least one of the tracking control and the focus control; a specifying process of specifying an area in which a property (or eccentricity, runout, state of a recording surface, such as scratches and dust) of the recording medium is not good, on the basis of a high-frequency component included in the error signal in the at least one of the tracking control and the focus control; and a controlling process of (i) controlling the servo device to change a control condition (or gain) in the automatic control in addition to or instead of (ii) controlling the reproducing device to change a reproduction condition of the laser light, in the specified area.

According to the reproducing method of the present invention, it is possible to receive the various benefits of the aforementioned reproducing apparatus of the present invention.

Incidentally, in response to the various aspects of the reproducing apparatus of the present invention described above, the reproducing method of the present invention can employ various aspects.

(Recording/Reproducing Method)

Hereinafter, the recording/reproducing method of the present invention will be discussed.

The above object of the present invention can be also achieved by a recording/reproducing method on a reproducing/reproducing apparatus provided with: (i) a recording/reproducing device (or optical pickup, laser driving circuit) for recording or reproducing data by irradiating laser light onto a disc-shaped recording medium; and (ii) a driving device (or driving circuit, actuator, objective lens) for performing at least one of tracking control and focus control, in the recording or the reproduction, the recording/reproducing method provided with: a servo process of performing automatic control on the driving device, on the basis of an error signal in the at least one control; a specifying process of specifying an area in which a property (or eccentricity, runout, state of a recording surface, such as scratches and dust) of the recording medium is not good, on the basis of a high-frequency component included in the error signal in the at least one control; and a controlling process of (i) controlling the servo device to change a control condition (or gain) in the automatic control and/or (ii) controlling the recording/reproducing device to change a recording condition or a reproduction condition of the laser light, in the specified area.

According to the recording/reproducing method of the present invention, it is possible to receive the various benefits of the aforementioned recording/reproducing apparatus of the present invention.

Incidentally, in response to the various aspects of the recording/reproducing apparatus of the present invention described above, the recording/reproducing method of the present invention can employ various aspects.

(Computer Program)

Hereinafter, the computer program of the present invention will be discussed.

The above object of the present invention can be also achieved by a computer program of instructions for recording control and for tangibly embodying a program of instructions executable by a computer provided in the aforementioned recording apparatus of the present invention (including its various aspects), the computer program making the computer function as at least one portion of the recording device, the driving device, the servo device, the specifying device, and the controlling device.

The above object of the present invention can be also achieved by a computer program of instructions for reproduction control and for tangibly embodying a program of instructions executable by a computer provided in the aforementioned reproducing apparatus of the present invention (including its various aspects), the computer program making the computer function as at least one portion of the reproducing device, the driving device, the servo device, the specifying device, and the controlling device.

The above object of the present invention can be also achieved by a computer program of instructions for recording/reproduction control and for tangibly embodying a program of instructions executable by a computer provided in the aforementioned recording/reproducing apparatus of the present invention (including its various aspects), the computer program making the computer function as at least one portion of the recording/reproducing device, the driving device, the servo device, the specifying device, and the controlling device.

According to each of the computer programs of the present invention, the recording apparatus, the reproducing apparatus, or the recording/reproducing apparatus of the present invention described above can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects in the recording apparatus, the reproducing apparatus, or the recording/reproducing apparatus of the present invention described above, each of the computer programs of the present invention can employ various aspects.

The above object of the present invention can be also achieved by a computer program product in a computer-readable medium for tangibly embodying a program of instructions executable by a computer provided in the aforementioned recording apparatus of the present invention (including its various aspects), the computer program product making the computer function as at least one portion of the recording device, the driving device, the servo device, the specifying device, and the controlling device.

The above object of the present invention can be also achieved by a computer program product in a computer-readable medium for tangibly embodying a program of instructions executable by a computer provided in the aforementioned reproducing apparatus of the present invention (including its various aspects), the computer program product making the computer function as at least one portion of the reproducing device, the driving device, the servo device, the specifying device, and the controlling device.

The above object of the present invention can be also achieved by a computer program product in a computer-readable medium for tangibly embodying a program of instructions executable by a computer provided in the aforementioned recording/reproducing apparatus of the present invention (including its various aspects), the computer program product making the computer function as at least one portion of the recording/reproducing device, the driving device, the servo device, the specifying device, and the controlling device.

According to each of the computer program products of the present invention, the recording apparatus, the reproducing apparatus, or the recording/reproducing apparatus of the present invention described above can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the recording apparatus, the reproducing apparatus, or the recording/reproducing apparatus of the present invention described above.

As explained above, according to the recording apparatus of the present invention, it is provided with the recording device, the driving device, the specifying device, and the controlling device. According to the recording method, it is provided with the recording process, the driving process, the specifying process, and the controlling process. Therefore, it is possible to record the data at higher speed, while reducing an influence of variations in the property of the recording surface of a single individual of the recording medium, such as an optical disc, or variations in the property of each individual of the recording medium.

Moreover, according to the reproducing apparatus of the present invention, it is provided with the reproducing device, the driving device, the specifying device, and the controlling device. According to the reproducing method, it is provided with the reproducing process, the driving process, the specifying process, and the controlling process. Therefore, it is possible to reproduce the data at higher speed, while reducing an influence of variations in the property of the recording surface of a single individual of the recording medium, such as an optical disc, or variations in the property of each individual of the recording medium.

Moreover, according to the recording/reproducing apparatus of the present invention, it is provided with the recording/reproducing device, the driving device, the specifying device, and the controlling device. According to the recording/reproducing method, it is provided with the recording/reproducing process, the driving process, the specifying process, and the controlling process. Therefore, it is possible to record or reproduce the data at higher speed, while reducing an influence of variations in the property of the recording surface of a single individual of the recording medium, such as an optical disc, or variations in the property of each individual of the recording medium.

Moreover, according to the computer program of the present invention, it makes a computer function as at least one of the recording apparatus, the reproducing apparatus, or the recording/reproducing apparatus of the present invention described above. Thus, it enables the recording apparatus, the reproducing apparatus, or the recording/reproducing apparatus to record or reproduce the data at higher speed, while reducing an influence of variations in the property of the recording surface of a single individual of the recording medium, such as an optical disc, or variations in the property of each individual of the recording medium.

BRIEF DESCRIPTION OF DRAWINGS

FIG. 1 is a block diagram conceptually showing a basic structure for mainly performing a tracking process of a recording/reproducing apparatus 1T in a first embodiment of the recording apparatus of the present invention.

FIG. 2 is a block diagram conceptually showing a basic structure for mainly performing a focus process of a recording/reproducing apparatus 1F in the first embodiment of the recording apparatus of the present invention.

FIG. 3 is a flowchart showing one recording operation centered on the tracking process or focus process by the recording/reproducing apparatus 1T in the first embodiment of the recording apparatus of the present invention.

FIG. 4 are waveform charts or the like schematically showing a generation process of a generating a wind comparator signal which indicates an area in which a mechanical property is not good and which is specified on the basis of a high-frequency component included in an error signal in the tracking process (or focus process) of the present invention.

FIG. 5 is a flowchart showing another recording operation centered on the selection of an optimum recording power by the recording/reproducing apparatus 1F in the first embodiment of the recording apparatus of the present invention.

FIG. 6 is a block diagram conceptually showing the basic structure of a recording/reproducing apparatus 1Ta in one modified example of the first embodiment of the recording apparatus of the present invention.

FIG. 7 is a block diagram conceptually showing the basic structure of a recording/reproducing apparatus 1Fa in another modified example of the first embodiment of the recording apparatus of the present invention.

FIG. 8 is a block diagram conceptually showing the basic structure of a recording/reproducing apparatus 2T in a second embodiment of the recording apparatus of the present invention.

FIG. 9 is a block diagram conceptually showing the basic structure of a recording/reproducing apparatus 2F in one modified example of the second embodiment of the recording apparatus of the present invention.

FIG. 10 is a block diagram conceptually showing the basic structure of a recording/reproducing apparatus 2Ta in the tracking process in another modified example of the second embodiment of the recording apparatus of the present invention.

FIG. 11 is a block diagram conceptually showing the basic structure of a recording/reproducing apparatus 2Fa in the focus process in another modified example of the second embodiment of the recording apparatus of the present invention.

FIG. 12 is a block diagram conceptually showing the basic structure of a recording/reproducing apparatus 3T in a third embodiment of the recording apparatus of the present invention.

FIG. 13 is a block diagram conceptually showing another basic structure of a recording/reproducing apparatus 3F in the third embodiment of the recording apparatus of the present invention.

FIG. 14 is a plan view conceptually showing aspects of a main beam and sub beams which are irradiated onto an optical disc by the recording/reproducing apparatus 3T (3F) in the third embodiment of the recording apparatus of the present invention.

FIG. 15 is a flowchart showing an entire operation including a recording operation and a control operation by the recording/reproducing apparatus 3T (or 3F) in the third embodiment of the recording apparatus of the present invention.

FIG. 16 is a flowchart showing one control operation centered on the tracking process by the recording/reproducing apparatus 3T in the third embodiment of the recording apparatus of the present invention.

FIG. 17 is a flowchart showing another control operation centered on the focus process by the recording/reproducing apparatus 3F in the third embodiment of the recording apparatus of the present invention.

FIG. 18 is a flowchart showing the recording operation in real time by a recording/reproducing apparatus 4 in a fourth embodiment of the recording apparatus of the present invention.

FIG. 19 is a flowchart showing the recording operation in real time by a recording/reproducing apparatus 5 in a fifth embodiment of the recording apparatus of the present invention.

FIG. 20 is a flowchart showing the recording operation in real time by a recording/reproducing apparatus 6 in a sixth embodiment of the recording apparatus of the present invention.

FIG. 21 is a flowchart showing the recording operation in real time by a recording/reproducing apparatus 7 in a seventh embodiment of the recording apparatus of the present invention.

FIG. 22 is a flowchart showing the recording operation in real time by a recording/reproducing apparatus 8 in an eighth embodiment of the recording apparatus of the present invention.

FIG. 23 is a flowchart showing the recording operation in real time by a recording/reproducing apparatus 9 in a ninth embodiment of the recording apparatus of the present invention.

DESCRIPTION OF REFERENCE CODES 1T recording/reproducing apparatus
1F recording/reproducing apparatus
10 control device
21 runout acceleration detector
22 eccentricity acceleration detector
31F focus servo circuit
31T (three-beam) tracking servo circuit
32F focus gain selection circuit
32T tracking gain selection circuit
33F focus driving circuit
33T tracking driving circuit
40 laser driving circuit
50 optical pickup
60 signal processing device
70 reproduction device
80 spindle motor
100 optical disc

BEST MODE FOR CARRYING OUT THE INVENTION

Hereinafter, the best mode for carrying out the present invention will be discussed in order for each embodiment, with reference to the drawings.

(1) First Embodiment of Recording Apparatus

Firstly, a recording/reproducing apparatus 1 in a first embodiment of the recording apparatus of the present invention will be explained with reference to FIG. 1 to FIG. 7. Incidentally, in the embodiment, an explanation will be given centered on a recording operation of the operation performed by the recording/reproducing apparatus; however, it is obvious that substantially the same can be applied to a reproduction operation.

(1-1) Basic Structure

Firstly, the basic structure of the recording/reproducing apparatus 1 in the first embodiment of the recording apparatus of the present invention will be explained with reference to FIG. 1 and FIG. 2. FIG. 1 is a block diagram conceptually showing a basic structure for mainly performing a tracking process of a recording/reproducing apparatus 1T in the first embodiment of the recording apparatus of the present invention. FIG. 2 is a block diagram conceptually showing a basic structure for mainly performing a focus process of a recording/reproducing apparatus 1F in the first embodiment of the recording apparatus of the present invention.

As shown in FIG. 1, the recording/reproducing apparatus 1T is provided with: a control device (CPU: Control Processing Unit) 10; an eccentricity acceleration detection circuit 22; a (three-beam) tracking servo circuit 31T; a tracking gain selection circuit 32T; a tracking driving circuit 33T; a tracking actuator 55T; a laser driving circuit 40; an optical pickup 50; a signal processing device 60; a reproduction device 70; and a spindle motor 80, as the basic structure for mainly performing the tracking process.

On the other hand, as shown in FIG. 2, the recording/reproducing apparatus 1F is provided with: a runout acceleration detection circuit 21; a focus servo circuit 31F; a focus gain selection circuit 32F; a focus driving circuit 33F; and a focus actuator 55F, as the basic structure for mainly performing the focus process, instead of the (three-beam) tracking servo circuit 31T, the tracking gain selection circuit 32T, the tracking driving circuit 33T, and the tracking actuator 55T, which are the basic structure of the recording/reproducing apparatus 1G shown in FIG. 1. Incidentally, in FIG. 1 and FIG. 2, the elements with the same numerical reference may have substantially the same function.

As shown in FIG. 1 and FIG. 2, the recording/reproducing apparatus 1T (or the recording/reproducing apparatus 1F) is an apparatus for recording data at a high recording speed, such as 18-time speed, and for reproducing the data recorded on an optical disc 100, by irradiating laser light LB onto the optical disc 100.

The control device (CPU) 10 is mainly provided with a CPU (Central Processing Unit), and outputs control signals to the aforementioned various constituent elements through not-illustrated control lines, to thereby integrally control the entire recording/reproducing apparatus 1T (or recording/reproducing apparatus 1F).

The optical pickup 50 is provided with: a hologram laser 51; a grating element 52; a collimator lens (or condenser lens) 53; an objective lens 54; the aforementioned focus actuator 55F; and the aforementioned tracking actuator 55T.

(1-1-1) Constituent Elements in Optical Pickup

The hologram laser 51 constitutes one specific example of the "recording device" of the present invention, and has a laser tip, a substrate, a light-receiving element, a hologram element, and the like, which are not illustrated. The laser tip and the light-receiving element are disposed on the same substrate, and the hologram element is disposed facing the laser light LB output side of the substrate. The laser tip emits the laser light LB, and the light-receiving element receives the inputted laser light LB. The hologram laser 51 lets the laser light LB, which is outputted from the laser tip, be transmitted therethrough as it is, and the hologram laser 51 deflects laser light which enters from a surface opposite to the incident surface of the laser light LB, to thereby focus it on the light-receiving element on the substrate. As described above, the hologram laser 51 has a function as a light source and a detector.

Moreover, in the embodiment, a three-beam tracking method may be used to perform the tracking process (or tracking control). Therefore, the light-receiving element which receives the reflected light of the laser light LB (more specifically, each of a plurality of light-receiving elements corresponding to respective one of a main beam and sub beams, described later) has a light-receiving portion which is divided into two (or four). For example, the light receiving element has a light-receiving device D1, which receives the reflected light on the left half of the laser light LB, and a light-receiving device D2, which receives the reflected light on the right half, on the basis of a travelling direction on the optical disc 100 of the laser light LB. From the light-receiving element having the light-receiving devices D1 and D2 divided as described above, a sum signal, which is a sum of signals obtained on the respective light-receiving portions, a difference signal, which is a difference in the signals, or a push-pull signal is outputted to the reproduction device 70, the tracking servo circuit 31T, and the focus servo circuit 31F, as a light-receiving signal.

The grating element 52 diffracts the laser light LB emitted from the hologram laser 51. In particular, the grating element 52 may generate a main beam for mainly recording the data and performing the tracking process, and two sub beams for mainly performing the tracking process, as described later. Moreover, the grating element 52 may include a transparent substrate having many slits (or grooves), or may include a liquid crystal slit including a liquid crystal element. Incidentally, notice that in the explanation below, if the notation is simply given by the laser light LB, it indicates not only the laser light itself which is emitted from the hologram laser 51 but also all of the main beam and the two sub beams which are generated on the grating element 52 in some cases.

The condenser lens (or collimator lens) 53 makes the incoming laser light LB substantially parallel and lets it enter the objective lens 54. More specifically, the condenser lens (or collimator lens) 53 makes each of the main beam and the two sub beams, which are generated on the grating element 52, substantially parallel and lets it enter the objective lens 54.

The objective lens 54 is provided with: the focus actuator 55F; and the tracking actuator 55T, described above. The focus actuator 55F and the tracking actuator 55T have a driving mechanism for changing the location of the objective lens 54. Moreover, the laser light LB, which is made substantially parallel light by the condenser lens 53, enters the objective lens 54. The objective lens 54 focuses the laser light LB and irradiates it on the optical disc 100.

(1-1-2) Constituent Elements for Tracking Process

In particular, with reference to FIG. 1, the constituent elements for the tracking process will be explained.

The tracking servo circuit 31T generates a tracking servo control signal (or tracking error signal) S31T on the basis of a light-receiving signal S51T, which is outputted from the hologram laser 51. Incidentally, the tracking servo circuit 31T may perform three-beam tracking servo which can deal with a plurality of wavelengths. In this case, more specifically, the tracking servo circuit 31T subtracts the push-pull signals of the two sub beams from the push-pull signal of the main beam, to thereby generate the tracking servo control signal S31T. After that, the tracking servo circuit 31T supplies the tracking servo control signal S31T to the eccentricity acceleration detection circuit 22 and the tracking gain selection circuit 32T. Incidentally, the three-beam tracking method is the same as that in the aforementioned prior art or other conventional technologies, so the basic explanation thereon will be omitted.

The eccentricity acceleration detection circuit 22 detects a high-frequency component of the tracking error signal. Then, the eccentricity acceleration detection circuit 22 outputs a signal which indicates that an error is detected, if the high-frequency component of the tracking error signal beyond an allowable range is detected with two different threshold values set in advance, by a comparator, such as a wind comparator.

The tracking gain selection circuit 32T selects the gain of the tracking process in a specified area and outputs a tracking gain signal S32T to the tracking driving circuit 33T, under the control of the control device 10.

The tracking driving circuit 33T constitutes one specific example of the "driving device" of the present invention, with the tracking actuator 55T and the objective lens 54. The tracking driving circuit 33T generates an actuator driving signal S33T and drives the tracking actuator 55T, on the basis of (i) the tracking servo control signal S31T, which is supplied from the tracking servo circuit 31T, and (ii) the tracking gain signal S32T, which is supplied from the tracking gain selection circuit 32T. That is, the tracking driving circuit 33T controls the tracking actuator 55T by supplying the actuator driving signal S33T, and it adjusts the position of the objective lens 54 in the radial direction (i.e. tracking direction) of the optical disc 100.

The tracking actuator 55T displaces (or drives) the position of the objective lens 54 in the tracking direction, in accordance with the actuator driving signal S33T, which is supplied from the tracking driving circuit 33T. In this manner, the tracking process (or tracking control) is performed.

(1-1-3) Constituent Elements for Focus Process

In particular, with reference to FIG. 2, the constituent elements for the focus process will be explained.

The focus servo circuit 31F generates a focus servo control signal (or focus error signal, S-shaped focus signal) S31T on the basis of a light-receiving signal S51F, which is outputted from the hologram laser 51. After that, the focus servo circuit 31F supplies the generated focus servo control signal S31F to the runout acceleration detection circuit 21 and the focus gain selection circuit 32F.

The runout acceleration detection circuit 21 detects a high-frequency component of the focus error signal. Then, the runout acceleration detection circuit 21 outputs a signal which indicates that an error is detected, if the high-frequency component of the focus error signal beyond an allowable range is detected with two different threshold values set in advance, by a comparator, such as a wind comparator.

The focus gain selection circuit 32F selects the gain of the focus process in a specified area and outputs a focus gain signal S32F to the focus driving circuit 33F, under the control of the control device 10.

The focus driving circuit 33F constitutes one specific example of the "driving device" of the present invention, with the focus actuator 55F and the objective lens 54. The focus driving circuit 33F generates an actuator driving signal S33F and drives the focus actuator 55F, on the basis of (i) the focus servo control signal S31F, which is supplied from the focus servo circuit 31F, and (ii) the focus gain signal S32F, which is supplied from the focus gain selection circuit 32F. That is, the focus driving circuit 33F controls the focus actuator 55F by supplying the actuator driving signal S33F, and it adjusts a distance of the objective lens 54 to the optical disc 100 (i.e. a position in the focus direction).

The focus actuator 55F displaces (or drives) the position of the objective lens 54 in the focus direction, in accordance with the actuator driving signal S33F, which is supplied from the focus driving circuit 33F. In this manner, the focus process (or focus control) is performed.

(1-1-4) Constituent Elements for Laser Light Power Control

As shown in FIG. 1 and FIG. 2, the laser driving circuit 40 is mainly provided with an amplification circuit, generates a laser driving signal S40 by amplifying or the like a record signal S60, which is inputted from the signal processing device 60, and supplies the laser driving signal S40 to the hologram laser 51 of the optical pickup 50. An amplification factor (or gain) on the laser driving circuit 40 is controlled by the signal processing device 60. If data is recorded onto the optical disc 100, the amplification factor is controlled such that the laser light LB with an energy amount which allows a phase change or a heat change on the optical disc 100 (hereinafter referred to a "recording power") is outputted from the hologram laser 51. On the other hand, if the data recorded on the optical disc 100 is reproduced, the amplification factor is controlled such that the laser light LB with an energy amount which does not allow a phase change or a heat change on the optical disc 100 (hereinafter referred to a "reproduction power") is outputted from the hologram laser 51. Incidentally, the laser driving circuit 40 may be disposed in the optical pickup 50.

(1-1-5) Other Constituent Elements

The signal processing device 60 has an input terminal IN, performs signal processing on the data, which is inputted from the exterior through the input terminal IN, on the basis of the control signal which is supplied from the control device through the not-illustrated control line, and outputs it to the laser driving circuit 40 as the record signal S60. More specifically, the signal processing device 60 generates the record signal S60 by appending an address, parity, error correction code (ECC), and a sync frame (or synchronization frame), by performing a scramble process, or by performing various modulation, such as 8/16 modulation, with respect to the data inputted from the exterior.

The reproduction device 70 has an output terminal OUT, and outputs reproduction data corresponding to a light-receiving signal S51a, which is supplied from the hologram laser 51, to the output terminal OUT, on the basis of the control signal which is supplied from the control device 10 through the not-illustrated control line. The light-receiving signal S51a is a signal which indicates the amount of light received on each light-receiving element, or the like, which is obtained by that the reflected light of the laser light LB, received by the hologram laser 51, is received by the plurality of light-receiving elements or the like. In particular, in the embodiment, the reflected light of the laser light LB is received by the light-receiving element or the like corresponding to each of the main beam and the two sub beams, and the light-receiving signal S51a corresponding to each of the main beam and the two sub beams is obtained.

The spindle motor 80 is adapted to rotate the optical disc 100 at a predetermined speed, on the basis of a spindle servo control signal which is generated by the light-receiving signal S51T or the like, which is outputted from the hologram laser 51. In particular, under the control of the control device 10, the spindle motor may be able to set a rotation angle for specifying an abnormal position and an abnormal section, described later.

(1-2) Operation Principle

Next, with reference to FIG. 3 to FIG. 5, an explanation will be given on the operation principle of the recording/reproducing apparatus in the first embodiment of the recording apparatus of the present invention.

(1-2-1) One Recording Operation Considered or Centered on Selection of Optimum Gain Firstly, a procedure of one recording operation considered or centered on the tracking process or the focus process in the first embodiment, will be explained with reference to FIG. 3 and FIG. 4. FIG. 3 is a flowchart showing one recording operation centered on the tracking process or focus process by the recording/reproducing apparatus in the first embodiment of the recording apparatus of the present invention. FIG. 4 are waveform charts or the like schematically showing a generation process of a generating a wind comparator signal which indicates an area in which a mechanical property is not good and which is specified on the basis of a high-frequency component included in an error signal in the tracking process (or focus process) of the present invention.

As shown in FIG. 3, firstly, if the optical disc is loaded (or inserted), data recording is started by using the laser light irradiated from the optical pickup 50, while the optical disc is rotated in accordance with e.g. the highest recording speed, by the spindle motor 80 under the control of the control device 10 (step S101).

Then, under the control of the control device 10, it is judged whether or not e.g. eccentricity acceleration (or runout acceleration) beyond the allowable range is detected, by the eccentricity acceleration detection circuit 22 (or the runout acceleration detection circuit 21) (step S102). Here, if the eccentricity acceleration (or runout acceleration) beyond the allowable range is detected (the step S102: Yes), (i) an abnormal value of a high-frequency component, which is included in an error signal in the tracking process, i.e. the tracking error signal or in an error signal in the focus process, i.e. the focus error signal, and (ii) an abnormal section (or an abnormal area) in which the abnormal value is detected, are detected, under the control of the control device 10 (step S103). More specifically, if the optical pickup 50 performs the tracking process in an area in which e.g. a groove is partially changed, the tracking error signal including the high-frequency component is detected, and the significant eccentricity acceleration beyond the allowable range is detected. Incidentally, the fact that the area with the groove partially changed is generated, is generally caused by that the shape of a stampa is not properly transferred if an injection molding device is suddenly cooled in a manufacturing process.

With regard to the abnormal value of the high-frequency component included in the tracking error signal and the abnormal section, more specifically, as shown in FIG. 4(a), the tracking error signal in a servo open state includes the high-frequency component. As shown in FIG. 4(b), the value of the high-frequency component is the abnormal value beyond the allowable range which is indicated by an upper limit value and a lower limit value for stable tracking servo. Incidentally, a section in which the abnormal value is detected, becomes the abnormal section. Incidentally, as described later, the focus error signal (e.g., S-shaped focus signal) in the focus servo can be also considered in substantially the same manner.

Then, under the control of the control device 10, the abnormal position and the abnormal section on the optical disc in which the abnormal value of the high-frequency component is detected, are specified (step S104). More specifically, the specified abnormal position may be indicated by a rotation angle or the like from a reference position on the optical disc.

Then, the control device 10 generates a wind comparator signal (WC signal) which can define the abnormal position and the abnormal section in the recording operation (step S105). Incidentally, under the control of the control device 10, an abnormal period on a time axis, such as a system clock, which is associated with the abnormal section by the wind comparator signal, may be able to be determined on the experimental, experiential, theoretical, or simulation basis.

More specifically, as shown in FIG. 4(*a*) and FIG. 4(*b*) in addition to FIG. 4(*c*), the wind comparator signal is provided with (i) a high level interval (i.e., HL), which is a section in which the gain and the recording power are changed, and (ii) a low level interval, which is a section in which power control is performed on the basis of the recording power determined in the normal tracking servo (or focus servo) or in the normal OPC (Optimum Power Control). The high level interval may be able to define a predetermined width which includes the abnormal position and the abnormal section on the optical disc in which the abnormal value of the high-frequency is detected. Alternatively, the high level interval may be able to define a predetermined width centered on the abnormal position and the abnormal section.

Then, under the control of the control device 10, the gain that holds a value larger than a standard value, i.e. the gain that holds a predetermined value in the abnormal section, is selected by the tracking gain selection circuit 32T (or focus gain selection circuit 32F), and the tracking gain signal S32T (or focus gain signal S32F) based on the selected gain, is outputted (step S106). Specifically, the gain that holds the predetermined value, may be selected, quickly and accurately, on the basis of a predetermined equation or a predetermined table, with the detected eccentricity acceleration as a parameter. The predetermined equation or the predetermined table may be prepared in advance, by experiments, simulations, or the like.

Then, under the control of the control device 10, the actuator driving signal S33T (or S33F) to which the gain that holds the predetermined value is applied, is outputted in the aforementioned high level interval by the tracking driving circuit 33T (or focus driving circuit 33F), and the tracking actuator 55T (or focus actuator 55F) is driven (step S107).

Then, under the control of the control device 10, it is judged whether or not the applied gain is optimal (step S108). Specifically, the judgment may be performed on the basis of the reproduction quality of the data recorded under the applied gain.

More specifically, if a jitter value is applied as the reproduction quality, one example of the following judgment criterion is found from a study by the inventors. That is, it is found that the allowable range of the normal jitter value, which indicates average reproduction quality, is a range of 8 to 9% including a detection margin. Moreover, it is also found that a jitter value smaller than 8% indicates good reproduction quality. It is also found that a jitter value larger than 9% indicates bad reproduction quality.

Moreover, in another example of the judgment criterion, if a reproduction RF envelope is applied as the reproduction quality, the judgment may be performed on the basis of whether or not the reproduction RF envelope is in a range which includes the defined range and +/−15% of margin. In addition, the judgment may be performed on the basis of whether or not the reproduction RF envelope, degree of modulation of 11T, or degree of modulation of 3T is increased. Incidentally, the judgment may be performed on the basis of whether or not the aforementioned jitter property and the reproduction RF envelope (or envelope property) is constant (or flat).

More specifically, according to the study by the inventors, it is found that if the thickness of the substrate is changed, spherical aberration is generated on the normal objective lens 54, to thereby increase the beam spot radius of the laser light irradiated on the optical disc. Because of this, the recording or reproduction cannot be performed in an accurate and appropriate position, and the extent of a RF reproduction signal becomes smaller than a normal value, and the RF envelope becomes not flat but uneven. With regard to such a partial thickness change of the substrate (or disc) and an entire thickness change of the substrate, (i) focus servo offset may be corrected, and/or (ii) spherical aberration may be corrected. Alternatively, the correction may be performed in a method in one modified example (refer to FIG. 10 or the like) in a second embodiment described later.

Moreover, in another example of the judgment criterion, the judgment may be performed on the basis of whether or not degree of modulation of a RF signal, a PI error which is an error rate obtained by counting the number of errors in the data reproduction, or an error rate of the RF signal itself, which are other reproduction qualities, is reduced.

More specifically, according to the study by the inventors, it is found that what has a close relationship with the optimum gain is the RF envelope. Moreover, it is found that what has a significant correlation with the optimum recording power, described later, is the jitter value and an asymmetry value (zero is the best). In addition, it is also found that what has a close correlation with the eccentricity acceleration caused by detrack and the runout acceleration caused by defocus is the PI error.

Back in FIG. 3.

As a result of the judgment in the step S108, if the applied gain is optimal (the step S108: Yes), the actual data recording is performed (step S109).

On the other hand, as a result of the judgment in the step S108, if the applied gain is not optimal (the step S108: No), the gain that holds the predetermined value in the abnormal section, is selected again by the tracking gain selection circuit 32T (or focus gain selection circuit 32F), under the control of the control device 10 (the step S106).

Moreover, on the other hand, as a result of the judgment in the step S102, if the eccentricity acceleration (or runout acceleration) beyond the allowable range or the like, is not detected (the step S102: No), the actual data recording is performed, as described above (the step S109).

(1-2-2) Another Recording Operation Considered or Centered on Selection of Optimum Recording Power Hereinafter, a procedure of another recording operation considered or centered on the selection of the optimum recording power in the first embodiment, will be explained with reference to FIG. 5. FIG. 5 is a flowchart showing another recording operation considered or centered on the selection of the optimum recording power by the recording/reproducing apparatus in the first embodiment of the recording apparatus of the present invention. Incidentally, in FIG. 5, the same processes as those in FIG. 3 described above, have the same step numbers, and the explanation thereof will be omitted.

As shown in FIG. 5, after the aforementioned step S101, it is judged whether or not e.g. the runout acceleration beyond the allowable range is detected by the runout acceleration detection circuit 21, under the control of the control device 10 (step S201). If the runout acceleration beyond the allowable range is detected (the step S201: Yes), (i) the abnormal value of the high-frequency component, which is included in the error signal in the focus process, i.e. the focus error (FE) signal, and (ii) the abnormal section are detected, under the control of the control device 10 (step S202). More specifically, if the optical pickup 50 performs the focus process in an area in a potato chip shape, i.e. an area in which the recording surface is rippling, the significant runout acceleration beyond the allowable range is detected. Incidentally, the fact that there arises the area in which the recording surface is rippling, is generally caused by a manufacturing process and a saving process. On the other hand, as a result of the judgment in the step S201, if the runout acceleration beyond the allowable range is not detected (the step S201: No), the actual data recording is performed, as described above (the step S109).

Then, after the aforementioned steps S104 and S105, the recording power that holds a value larger than a standard value, i.e. the recording power that holds a predetermined value in the abnormal section, is selected by the laser driving circuit 40, under the control of the control device 10 (step S203). Specifically, the recording power that holds the predetermined value may be selected, quickly and accurately, on the basis of a predetermined equation or a predetermined table with the detected eccentricity acceleration as a parameter.

Then, under the control of the control device 10, the laser driving signal S40 to which the recording power that holds the predetermined value is applied, is outputted in the aforementioned high level interval by the laser driving circuit 40, and the hologram laser 51 is driven (step S204).

Then, under the control of the control device 10, it is judged whether or not the applied recording power is optimal (step S205). Incidentally, the judgment criterion or the like may be substantially the same as that in the aforementioned one recording operation considered or centered on the tracking process.

As described above, according to the recording/reproducing apparatus in the first embodiment of the present invention, the gain, the recording power, or servo offset or the like is optimized in association with the abnormal section so that the reproduction quality is optimal in the abnormal section in which the eccentricity acceleration or the runout acceleration beyond the allowable range is detected.

Therefore, it is possible to record the data, on the basis of a higher recording speed held by the recording apparatus as a function and an ability, even onto the recording medium in which, conventionally, the data cannot be recorded at high speed but recorded at low speed because there is the abnormal section in which the value which indicates the property (or mechanical property) is away from the allowable range. In other words, it is possible to make the best use of potential performances of the recording apparatus.

As a result, it is possible to record the data at higher speed, while further reducing an influence of variations of the property in the recording surface of a single individual of the recording medium, such as an optical disc, or variations of the property in each individual of the recording medium.

In addition, there is also such an advantage that quality control in manufacturing the recording medium, such as an optical disc, is performed as before and does not become complicated.

(1-3) Basic Structure in Modified Examples of First Embodiment of Recording Apparatus Next, with reference to FIG. 6 and FIG. 7, an explanation will be given on the basic structure of a recording/reproducing apparatus 1Ta (or recording/reproducing apparatus 1Fa) in a modified example of the first embodiment of the recording apparatus of the present invention. FIG. 6 is a block diagram conceptually showing the basic structure of the recording/reproducing apparatus 1Ta. FIG. 7 is a block diagram conceptually showing the basic structure of the recording/reproducing apparatus 1Fa.

As shown in FIG. 6 and FIG. 7, the recording/reproducing apparatus 1Ta is particularly provided with a lens position sensor 56T in the tracking process. Moreover, the recording/reproducing apparatus 1Fa is provided with a lens position sensor 56F in the focus process. The other constituent elements are the same as those in the aforementioned first embodiment, so that the explanation thereof will be omitted.

Specifically, the objective lens 54 and the control device 10 can specify the abnormal position (or abnormal section) in which the tracking process and the focus process are not accurately performed, i.e. the abnormal position (or abnormal section) in which the tracking is not accurate, on the basis of the extent of a difference between (i) the value of an output signal from the lens position sensor 56T (or 56F) and (ii) the value of the tracking error signal or the focus error signal. Incidentally, the lens position sensor 56T (or 56F) may include an arithmetic circuit for calculating the difference, such as a sub tractor.

Moreover, the abnormal position (or the abnormal section) may be specified by monitoring the amount of electric current which flows in the tracking actuator 55T or the focus actuator 55F, in addition to or instead of being based on the output signal of the lens position sensor 56T (or 56F). More specifically, for example, an inclination angle in the radial direction on the objective lens 54 can be uniquely determined by a product of (i) the amount of electric current which flows in the actuator and (ii) a driving sensitivity value.

Moreover, the abnormal position may be specified only by monitoring the position of the lens, or the amount of current.

(2) Second Embodiment of Recording Apparatus

Next, a recording/reproducing apparatus 2 in a second embodiment of the recording apparatus of the present invention will be explained with reference to FIG. 8 to FIG. 11.

(2-1) Basic Structure

Firstly, the basic structure of the recording/reproducing apparatus 2T in the second embodiment of the recording apparatus of the present invention will be explained with reference to FIG. 8. FIG. 8 is a block diagram conceptually showing the basic structure of the recording/reproducing apparatus 2T in the second embodiment of the recording apparatus of the present invention.

As shown in FIG. 8, the recording/reproducing apparatus 2 in the second embodiment may be particularly provided with: a low pass filter LPF; a high pass filter HPF; an optimum gain adjustment circuit 32Ta; and an optimum gain adjustment circuit 32Tb, as the tracking gain selection circuit 32T. Incidentally, the other constituent elements and the operation principle are substantially the same as those in the aforementioned embodiment, so that the explanation thereof will be omitted.

As shown in FIG. 8, the tracking error signal S31T passes through the low each of the low pass filter LPF and the high pass filter HPF.

In a section (or area) which corresponds to a low-frequency component included in the tracking error signal which passes through the low pass filter LPF, i.e. the section in which the eccentricity acceleration is small, the tracking gain signal S32T for the normal tracking servo is outputted to the tracking driving circuit 33T by the optimum gain adjustment circuit 32Ta under the control of the control device 10. On the other hand, in a section (or area) which corresponds to a high-frequency component included in the tracking error signal which passes through the high pass filter HPF, the tracking gain signal S32T for the tracking servo based on the optimum gain in this section, is outputted to the tracking driving circuit 33T by the optimum gain adjustment circuit 32Tb under the control of the control device 10. In particular, under the control of the control device 10, the tracking gain signal S32T through the low pass filter LPF may be selected by a switching circuit, or the tracking gain signal S32T through the high pass filter HPF may be selected.

(2-2) Basic Structure in One Modified Example of Second Embodiment of Recording Apparatus Next, with reference to FIG. 9, an explanation will be given on the basic structure of a recording/reproducing apparatus 2F in one modified example of the second embodiment of the recording apparatus of the present invention. FIG. 9 is a block diagram conceptually showing the basic structure of the recording/reproducing apparatus 2F in one modified example of the second embodiment of the recording apparatus of the present invention.

As shown in FIG. 9, the recording/reproducing apparatus 2F in one modified example of the second embodiment is particularly provided with: a low pass filter LPF; a high pass filter HPF; an optimum gain adjustment circuit 32Fa; and an optimum gain adjustment circuit 32Fb, as the focus gain selection circuit 32F. Incidentally, the other constituent elements and the operation principle are substantially the same as those in the aforementioned embodiment, so that the explanation thereof will be omitted.

As shown in FIG. 9, the focus error signal S31F passes through each of the low pass filter LPF and the high pass filter HPF.

In a section (or area) which corresponds to a low-frequency component included in the focus error signal which passes through the low pass filter LPF, i.e. the section in which the runout acceleration is small, the focus gain signal S32F for the normal focus servo is outputted to the focus driving circuit 33F by the optimum gain adjustment circuit 32Fa under the control of the control device 10. In addition, in this section, power control is performed on the basis of the recording power that is determined by the normal OPC (Optimum Power Control). On the other hand, in a section (or area) which corresponds to a high-frequency component included in the focus error signal which passes through the high pass filter HPF, i.e. the section in which the runout acceleration is large, the focus gain signal S32F for the focus servo based on the optimum gain in this section is outputted to the focus driving circuit 33F by the optimum gain adjustment circuit 32Fb under the control of the control device 10. In particular, under the control of the control device 10, the focus gain signal S32F through the low pass filter LPF may be selected by a switching circuit, or the focus gain signal S32F through the high pass filter HPF may be selected. In addition to this or instead of this, in this section, power control may be performed so as to output a recording power greater than the recording power that is determined by the OPC (Optimum Power Control).

(2-3) Basic Structure in Another Modified Example of Second Embodiment of Recording Apparatus Next, with reference to FIG. 10 and FIG. 11, an explanation will be given on the basic structure of a recording/reproducing apparatus 2Ta (or a recording/reproducing apparatus 2Fa) in another modified example of the second embodiment of the recording apparatus of the present invention. FIG. 10 is a block diagram conceptually showing the basic structure of the recording/reproducing apparatus 2Ta. FIG. 11 is a block diagram conceptually showing the basic structure of the recording/reproducing apparatus 2Fa. Incidentally, this another modified example of the second embodiment may be applied as another modified example of the first embodiment.

As shown in FIG. 10, the recording/reproducing apparatus 2Ta in another modified example of the second embodiment may be further provided with a high-speed polarizing element 57T and an element driving circuit 59T, particularly with respect to the recording/reproducing apparatus 2T shown in FIG. 8. The other constituent elements and the operation principle are the same as those in the aforementioned first embodiment, so that the explanation thereof will be omitted. Incidentally, the tracking gain signal 32Ta through the low pass filter LPF is inputted to the tracking driving circuit 33T. Moreover, the tracking gain signal 32Tb through the high pass filter HPF is inputted to the element driving circuit 59T.

Therefore, under the control of the control device 10 and the element driving circuit 59T, it is possible to deal with the higher-frequency component with a larger frequency by using the high-speed polarizing element 57T. Specifically, by using the high-speed polarizing element 57T, it is possible to change the polarization direction of the laser light at higher speed, in response to the larger eccentricity acceleration and the higher-frequency component with a frequency that is larger than a driving frequency, both of which depend on the performances of the tracking actuator 55T or the like. More specifically, as one specific example of the high-speed polarizing element 57T, an AOD (Audio Optical Defector) can be listed. In the principle of the AOD, ultrasound waves are generated in a special crystal, such as tellurium dioxide and LiNbO3, and the interval in diffraction grating in the crystal is set On (e.g., opened) or Off (e.g., closed) at high speed, to thereby change the polarization direction of the laser light. Incidentally, this principle is generally used in a laser printer and a high-speed Fax.

On the other hand, as shown in FIG. 11, the recording/reproducing apparatus 2Fa in another modified example of the second embodiment may be further provided with a high-speed refractive-index changing element 57F and an element driving circuit 59F, particularly with respect to the recording/reproducing apparatus 2F shown in FIG. 9. Incidentally, the focus gain signal S32Fa through the low pass filter LPF is inputted to the focus driving circuit 33F. Moreover, the focus gain signal S32Fb through the high pass filter HPF is inputted to the element driving circuit 59F.

By virtue of the high-speed refractive-index changing element 57F, it is possible to change a refractive index with respect to the laser light at higher speed, in response to the larger runout acceleration and the higher-frequency component with a frequency larger than a driving frequency, which depend on the performances of the focus actuator 55F or the like. More specifically, as one specific example of the constituent materials for the high-speed refractive-index changing element 57F, a material which uses an electro-optic effect, such as Piezo Actuators, and a material for a liquid crystal can be listed. Moreover, the high-speed refractive-index changing element 57F includes an optical member in which the refractive index changes at high speed. In the optical member, a refraction angle of divergent light which passes through the optical member is changed at high speed. Thus, it is possible to change the angle of a flux of light which enters the objective lens, highly accurately, with respect to the runout of the optical disc, i.e. a small change in thickness of the substrate of the optical disc. Therefore, even in a portion in which the thickness of the substrate is changed, i.e. in a portion in which the runout acceleration is large, it is possible to inhibit the generation of aberration, such as spherical aberration, and it is possible to properly perform focusing. Thus, the more accurate focus process (or focus automatic control, focus servo) can be realized. Moreover, as the high-speed refractive-index changing element 57F, a beam expander, which is used in the optical system of a Blu-ray system, may be employed. This beam expander allows the flux of light which enters the objective lens 54 to be diffused and focused, to thereby generate spherical aberration in the opposite direction. Thus, it is possible to reduce an influence of the spherical aberration caused by the actual change in thickness of the substrate.

Incidentally, there may be provided both (i) the high-speed polarizing element 57T, which is provided for the recording/reproducing apparatus 2Ta in another modified example of the second embodiment, and (ii) the high-speed refractive-index changing element 57F, which is provided for the recording/reproducing apparatus 2Fa in another modified example of the second embodiment.

(3) Third Embodiment of Recording Apparatus

Next, a recording/reproducing apparatus 3 in a third embodiment of the recording apparatus of the present invention will be explained with reference to FIG. 12 to FIG. 17.

(3-1) Basic Structure

Firstly, the basic structure of the recording/reproducing apparatus 3 in the third embodiment of the recording apparatus of the present invention will be explained with reference to FIG. 12 to FIG. 14. FIG. 12 is a block diagram conceptually showing the basic structure of a recording/reproducing apparatus 3T in the third embodiment of the recording apparatus of the present invention. FIG. 13 is a block diagram conceptually showing another basic structure of a recording/reproducing apparatus 3F in the third embodiment of the recording apparatus of the present invention. FIG. 14 is a plan view conceptually showing aspects of the main beam and the sub beams which are irradiated onto the optical disc by the recording/reproducing apparatus 3T (3F) in the third embodiment of the recording apparatus of the present invention. Incidentally, FIG. 14 shows the spots formed by the main beam and the sub beams on the recording layer; however, the appearance, such as a diameter, of the spot of the laser light is merely illustration, and it does not truly depict the size, such as a diameter, of the actual spot.

As shown in FIG. 12 and FIG. 13, the recording/reproducing apparatus 3T (or recording/reproducing apparatus 3F) in the third embodiment may be particularly provided with: a leading beam detection circuit 91; and a following beam detection circuit 92. The other constituent elements and the operation principle are substantially the same as those in the aforementioned embodiment, so that the explanation thereof will be omitted.

Specifically, in the three-beam tracking process, as shown in FIG. 14, there are provided three laser lights of a leading beam, a main beam, and a following beam. More specifically, if the laser light LB is focused on the recording surface, i.e. if the data is being recorded into the recording layer, the main beam forms the spot on a groove track in which the data is currently being recorded. Moreover, the two sub beams form the spots in positions, each of which is a half distance of a track pitch Tp shifted from the spot formed by the main beam (specifically, on two land tracks LT adjacent to the groove track GT in which the data is currently being recorded). Since the data is recorded from the inner to the outer circumferential side of the recording layer, here, the sub beam which forms the spot on the upper right (i.e. on the outer circumferential side) of the spot formed by the main beam in FIG. 14 is referred to as the leading beam, and the sub beam which forms the spot on the lower left (i.e. on the inner circumferential side) of the spot formed by the main beam in FIG. 14 is referred to as the following beam. Moreover, in FIG. 14, a recorded portion in which the data is already recorded is shown in a hatching pattern. That is, the data is not recorded in the groove tracks GT located on the both sides of the spot formed by the leading beam. On the other hand, the data is recorded in the groove tracks GT located on the both sides of the spot formed by the following beam.

At this time, if the center of the spot formed by the main beam is not shifted from substantially the center of the groove track GT (i.e. if there is no tracking shift, as shown in the spot in a solid line in FIG. 14), the center of the spot of each of the leading beam and the following beam is formed at substantially the center of the land track LT. Thus, the amounts of reflected light of the leading beam, which are received on the two (or two-divided) light receiving devices D1 and D2, are substantially equal, and the amounts of reflected light or the like of the following beam, which are received on the two (or two-divided) light receiving devices D1 and D2, are substantially equal. That is, the amounts of reflected light or the like in the right portion and the left portion of the spot formed by the leading beam are equal to each other, and the amounts of reflected light or the like in the right portion and the left portion of the spot formed by the following beam are equal to each other.

On the other hand, if the center of the spot formed by the main beam is shifted, for example, to the right from substantially the center of the groove track GT (i.e. if there is a tracking shift, as shown in the spot in a dashed line in FIG. 14), the center of the spot of each of the leading beam and the following beam is formed at a position which is shifted to the right from substantially the center of the land track LT. Thus, the amounts of reflected light of the leading beam, which are received on the two (or two-divided) light receiving devices D1 and D2, are different from each other, and the amounts of reflected light or the like of the following beam, which are received on the two (or two-divided) light receiving devices D1 and D2, are different from each other. That is, the amounts of reflected light or the like in the right portion and the left portion of the spot formed by the leading beam are different from each other, and the amounts of reflected light or the like in the right portion and the left portion of the spot formed by the following beam are different from each other.

(3-2) Operation Principle

Next, with reference to FIG. 15 to FIG. 17, an explanation will be given on the operation principle of the recording/reproducing apparatus in the third embodiment of the recording apparatus of the present invention.

(3-2-1) Entire Operation including Recording Operation and Control Operation

Firstly, a procedure of an entire operation including a recording operation and a control operation in the third embodiment will be explained with reference to FIG. 15. FIG. 15 is a flowchart showing the entire operation including the recording operation and the control operation by the recording/reproducing apparatus in the third embodiment of the recording apparatus of the present invention.

As shown in FIG. 15, firstly, under the control of the control device 10, the recording by the three-beam tracking process is started by the optical pickup 50 (step S301).

Then, under the control of the control device 10, the data is actually recorded by the optical pickup 50 (step S301c).

Then, under the control of the control device 10, it is judged whether or not the recording is ended (step S305). If the recording is not ended (the step S305: No), the operational flow returns to the step S301c, and the data recording is continued.

On the other hand, as a result of the judgment in the step S305, if the recording is ended (the step S305: Yes), a series of recording operation is ended.

Simultaneously with or before or after the aforementioned recording operation, the control operation including the tracking process or the focus process is performed. The control operation including the tracking process or the focus process will be explained in FIG. 16 and FIG. 17 described later.

(3-2-2) One Control Operation centered on Tracking Process

Next, a procedure of one control operation centered on the tracking process in the third embodiment will be explained with reference to FIG. 16. FIG. 16 is a flowchart showing one control operation centered on the tracking process by the recording/reproducing apparatus in the third embodiment of the recording apparatus of the present invention.

Firstly, under the control of the control device 10, it is judged whether or not the tracking error signal (or TE signal) beyond a set range, is detected by the leading beam in the three-beam tracking process (step S302). If the tracking error signal (or TE signal) beyond the set range, is detected, i.e. if the tracking error signal is not in the set range (the step S302: No), the abnormal value of the high-frequency component included in the tracking error signal (or TE signal) and the abnormal section (or abnormal area) in which the abnormal value is detected, are detected under the control of the control device 10, as described above (the step S103). On the other hand, if the tracking error signal is in the set range (the step S302: Yes), it is judged again whether or not the tracking error signal is detected, as described above (the step S302).

Then, as described above, under the control of the control device 10, the abnormal position and the abnormal section on the optical disc in which the abnormal value of the high-frequency component is detected are specified (the step S104).

Then, a time length in which the recording is performed by the main beam in the specified abnormal position is predicted (step S104c).

Then, as described above, under the control of the control device 10, a wind comparator signal (WC signal) which can define the abnormal position and the abnormal section in the recording operation is generated (the step S105).

Then, under the control of the control device 10, the leading beam is adjusted by the optimum gain adjustment circuit 32Tb to have the gain that holds the predetermined value in the detected abnormal section (step S303).

Then, under the control of the control device 10, the tracking process to which the adjusted gain is applied, is performed by the main beam which actually performs the recording (step S304). Then, the operational flow returns to the step S302 described above. Incidentally, under the control of the control device 10, simultaneously with or after or before the aforementioned step S304 or the like, the value that indicates the reproduction quality of the recorded information, may be measured, and it may be judged whether or not the gain adjusted in the above manner, is appropriate on the basis of the measured value. If it is not appropriate, negative feedback control (or feedback control) may be performed on the gain.

(3-2-3) Another Control Operation Centered on Focus Process

Next, a procedure of another control operation centered on the focus process in the third embodiment will be explained with reference to FIG. 17. FIG. 17 is a flowchart showing another control operation centered on the focus process by the recording/reproducing apparatus in the third embodiment of the recording apparatus of the present invention. Incidentally, in FIG. 17, the same processes as those in FIG. 16 described above carry the same step numbers, and the explanation thereof will be omitted.

As shown in FIG. 17, after the recording by the three-beam tracking process is started by the optical pickup 50, it is judged whether or not the focus error signal (or FE signal) beyond a set range, is detected by the leading beam in the three-beam tracking process, under the control of the control device 10 (step S302a). If the focus error signal (or FE signal) beyond the set range is detected, i.e. if the focus error signal is not in the set range (the step S302a: No), the processes in the aforementioned step S103 to step S105 are performed. On the other hand, if the focus error signal is in the set range (the step S302a: Yes), it is judged again whether or not the focus error signal is detected, as described above (the step S302a).

Then, under the control of the control device 10, the leading beam is adjusted by the laser driving circuit 40 to have the gain that holds the predetermined value in the detected abnormal section (step S303a).

Then, under the control of the control device 10, the adjusted recording power is applied by the main beam which actually performs the recording, and the hologram laser 51 is driven (step S304a). Then, the operational flow returns to the step S302a described above.

As a result, by positively using the leading beam in the three-beam tracking process, it is possible to detect the abnormal value and the abnormal section of the eccentricity acceleration or the runout acceleration, more quickly than the case of the main beam that actually performs the recording, by a time length corresponding to one rotation of the optical disc. Therefore, it is possible to perform the recording based on the tracking servo (or focus servo) to which the optimum gain is applied, in the main beam, and it is also possible to record the data with the recording power which is optimal in real time.

(4) Fourth Embodiment of Recording Apparatus

Next, a recording/reproducing apparatus 4 in a fourth embodiment of the recording apparatus of the present invention will be explained with reference to FIG. 18. Incidentally, the constituent elements in the fourth embodiment are the same as those in the aforementioned first to three embodiments, so that the explanation thereof will be omitted.

(4-1) Operation Principle

Firstly, with reference to FIG. 18, an explanation will be given on the operation principle of the recording/reproducing apparatus 4 in the fourth embodiment of the recording apparatus of the present invention. FIG. 18 is a flowchart showing the recording operation in real time by the recording/reproducing apparatus 4 in the fourth embodiment of the recording apparatus of the present invention. Incidentally, in FIG. 18, the same processes as those in the aforementioned first to three embodiments have the same step numbers, and the explanation thereof will be omitted.

As shown in FIG. 18, firstly, under the control of the control device 10, it is judged whether or not the tracking error signal in the main beam has the abnormal value beyond the allowable range which is indicated by the upper limit value and the lower limit value for stable tracking servo (step S401). If it is judged that the tracking error signal has the abnormal value (the step S401: No), each process in the aforementioned step S104 to step S107 is performed. On the other hand, if it is judged that the tracking error signal is in the set range and does not have the abnormal value (the step S401: Yes), it is judged whether or not the recording is ended, as described above (the step S305).

(5) Fifth Embodiment of Recording Apparatus

Next, a recording/reproducing apparatus 5 in a fifth embodiment of the recording apparatus of the present invention will be explained with reference to FIG. 19. Incidentally, the constituent elements in the fifth embodiment are the same as those in the aforementioned first to three embodiments, so that the explanation thereof will be omitted.

(5-1) Operation Principle

Firstly, with reference to FIG. 19, an explanation will be given on the operation principle of the recording/reproducing apparatus 5 in the fifth embodiment of the recording apparatus of the present invention. FIG. 19 is a flowchart showing the recording operation in real time by the recording/reproducing apparatus 5 in the fifth embodiment of the recording apparatus of the present invention. Incidentally, in FIG. 19, the same processes as those in the aforementioned first to fourth embodiments have the same step numbers, and the explanation thereof will be omitted.

As shown in FIG. 19, firstly, under the control of the control device 10, if it is judged that the tracking error signal has the abnormal value beyond the allowable range which is indicated by the upper limit value and the lower limit value for stable tracking servo (the step S401: No), the abnormal value of the tracking error signal is detected and stored by a memory device, such as a memory, under the control of the control device 10 (step S501).

Then, each process in the aforementioned step S104 and step S105 is performed.

Then, under the control of the control device 10, the gain that holds the predetermined value in the abnormal section is selected by the tracking gain selection circuit 32T, on the basis of the abnormal value of the stored tracking error signal (step S502).

Specifically, the gain that holds the predetermined value may be selected, quickly and accurately, on the basis of a predetermined equation or a predetermined table with the stored tracking error signal as a parameter. The predetermined equation or the predetermined table may be prepared in advance, by experiments, simulations, or the like.

Then, the process in the aforementioned step S107 is performed.

(6) Sixth Embodiment of Recording Apparatus

Next, a recording/reproducing apparatus 6 in a sixth embodiment of the recording apparatus of the present invention will be explained with reference to FIG. 20. Incidentally, the constituent elements in the sixth embodiment are the same as those in the aforementioned first to three embodiments, so that the explanation thereof will be omitted.

(6-1) Operation Principle

Firstly, with reference to FIG. 20, an explanation will be given on the operation principle of the recording/reproducing apparatus 6 in the sixth embodiment of the recording apparatus of the present invention. FIG. 20 is a flowchart showing the recording operation in real time by the recording/reproducing apparatus 6 in the sixth embodiment of the recording apparatus of the present invention. Incidentally, in FIG. 20, the same processes as those in the aforementioned first to fifth embodiments have the same step numbers, and the explanation thereof will be omitted.

As shown in FIG. 20, after the data recording is started by the laser light irradiated from the optical pickup 50 in the aforementioned step S101, "0" is substituted for a variable "t" under the control of the control device 10 (step S601).

Then, as a result of a judgment of whether or not there is the abnormality in the tracking error signal e.g. in each track, if it is judged that the tracking error signal has the abnormal value (the step S401: No), the abnormal position and the abnormal section on the optical disc in which the abnormal value is detected are specified, under the control of the control device 10, as described above (the step S104). In particular, it may be confirmed that there is the abnormality in the tracking error signal in substantially the same position (or at the rotation angle from the reference position).

Then, under the control of the control device 10, the variable "t" is incremented by "1" (step S602). Therefore, it is possible to count the number of tracks in which the abnormality in the tracking error is continuously generated.

Then, under the control of the control device 10, it is judged whether or not the variable "t" is equal to a predetermined number "n" (step S603). If the variable "t" is equal to the predetermined number "n" (the step S603: Yes), each process in the aforementioned step S105 to step S107 is performed. Here, the predetermined number "n" in the embodiment may be determined on the basis of the characteristics of the "abnormality" in the present invention, for example, on the experimental, experiential, theoretical, or simulation basis.

In other words, by judging whether or not the variable "t" is equal to the predetermined number "n" in the step S603, it is possible to judge whether or not the abnormality in the tracking error signal is continuously generated over the "n" tracks. Then, if the abnormality is continuously generated over the "n" tracks, the gain is set to have an optimum value.

In addition, in the embodiment, if there is a predictable tendency in the position in which there is the abnormality in the tracking error signal, such as the rotational angle from the reference position is gradually changed with the displacement to the track toward the outer circumferential side, in order to consider or reflect this tendency, the position in which the gain is set to have an optimum value, i.e. a high level section included in the wind comparator signal described above, may be gradually shifted with the displacement of the laser beam on the track.

As a result, it is possible not to deal with the sudden abnormality in the tracking error signal caused by an influence, such as noise, but to deal with the abnormality in the tracking error signal which is periodically generated in the predetermined position (or at the rotation angle from the reference position) on the optical disc. Thus, it is possible to record the data, more quickly and efficiently.

(7) Seventh Embodiment of Recording Apparatus

Next, a recording/reproducing apparatus 7 in a seventh embodiment of the recording apparatus of the present invention will be explained with reference to FIG. 21. Incidentally, the constituent elements in the seventh embodiment are the same as those in the aforementioned first to three embodiments, so that the explanation thereof will be omitted.

(7-1) Operation Principle

Firstly, with reference to FIG. 21, an explanation will be given on the operation principle of the recording/reproducing apparatus 7 in the seventh embodiment of the recording apparatus of the present invention. FIG. 21 is a flowchart showing the recording operation in real time by the recording/reproducing apparatus 7 in the seventh embodiment of the recording apparatus of the present invention. Incidentally, in FIG. 21, the same processes as those in the aforementioned first to sixth embodiments have the same step numbers, and the explanation thereof will be omitted.

As shown in FIG. 21, as a result of the judgment in the step S401, if it is judged that the tracking error signal has the abnormal value (the step S401: No), the recording is temporarily disrupted or stopped under the control of the control device 10 (step S701).

Then, under the control of the control device 10, an area in which the recording is scheduled to be performed is irradiated with the laser light that holds the reproduction power (step S702).

Moreover, as a result of the judgment in a step S401a which is the same as the step S401 described above, if it is judged that the tracking error signal is not in the set range and has the abnormal value (the step S401a: No), each process in the aforementioned step S104 to step S107 is performed, and the gain is changed to have an optimum value, under the control of the control device 10. Incidentally, in the step S104, the abnormal position in which the abnormality is continuously generated over the "n" tracks may be specified as in the sixth embodiment. Moreover, the step S401a may be omitted.

Then, under the control of the control device 10, the recording is restarted (step S703).

On the other hand, as a result of the judgment in the step S401a described above, if it is judged that the tracking error signal is in the set range and does not have the abnormal value (the step S401a: Yes), the recording is restarted under the control of the control device 10, as described above (the step S703).

(8) Eighth Embodiment of Recording Apparatus

Next, a recording/reproducing apparatus 8 in an eighth embodiment of the recording apparatus of the present invention will be explained with reference to FIG. 22. Incidentally, the constituent elements in the eighth embodiment are the same as those in the aforementioned first to three embodiments, so that the explanation thereof will be omitted.

(8-1) Operation Principle

Firstly, with reference to FIG. 22, an explanation will be given on the operation principle of the recording/reproducing apparatus 8 in the eighth embodiment of the recording apparatus of the present invention. FIG. 22 is a flowchart showing the recording operation in real time by the recording/reproducing apparatus 8 in the eighth embodiment of the recording apparatus of the present invention. Incidentally, in FIG. 22, the same processes as those in the aforementioned first to seventh embodiments have the same step numbers, and the explanation thereof will be omitted.

As shown in FIG. 22, after the data recording is started by the laser light emitted from the optical pickup 50 in the aforementioned step S101, "0" is substituted for a variable "f", under the control of the control device 10 (step S801).

Then, as a result of the judgment in the aforementioned step S401, if it is judged that the tracking error signal has the abnormal value (the step S401: No), it is judged whether or not the variable "f" is equal to "0", under the control of the control device 10 (step S802). If the variable "f" is equal to "0" (the step S802: Yes), "1" is substituted for the variable "f" under the control of the control device 10 (step S803).

Then, under the control of the control device 10, the tracking error signal detected in the step S401 is stored as a variable "TE1" by a memory device, such as a memory (step S804).

Then, under the control of the control device 10, each process in the aforementioned step S104 to step S107 is performed, and the gain is changed to have an optimum value.

On the other hand, as a result of the judgment in the step S802, if the "f" is not equal to "0", i.e. if the "f" is equal to "1" (the step S802: No), the tracking error signal detected in the step S401 is stored as a variable "TE2" by a memory device, such as a memory (step S805). Specifically, since the "f" is "1", it is found that the optimum value at the previous stage is not sufficient.

Then, under the control of the control device 10, it is judged whether or not the value of the variable "TE1" is greater than the value of the variable "TE2" (step S806). If the value of the variable "TE1" is greater than the value of the variable "TE2" (the step S806: Yes), the abnormal value of the tracking error signal is reduced. Thus, under the control of the control device 10, the extent of the gain is changed by a predetermined amount in the same direction as an increase and decrease direction in which the optimum value is determined immediately before (step S807).

Then, under the control of the control device 10, the value of the variable "TE2" is substituted for the variable "TE1" (step S808). Therefore, the abnormal value that is judged to be smaller as a result of this time's comparison and the abnormal value that is detected next time are compared. Thus, it is possible to realize the judgment of the increase and decrease of the abnormal value, more highly accurately, not on the basis of the detected time direction, but on the basis of the value of the tracking error signal.

On the other hand, as a result of the judgment in the step S806, if the value of the variable "TE1" is not greater than the value of the variable "TE2", i.e. if the value of the variable "TE1" is smaller (the step S806: No), the abnormal value of the tracking error signal is increased. Thus, under the control of the control device 10, the extent of the gain is changed by a predetermined amount in the opposite direction to the increase and decrease direction in which the optimum value is determined immediately before (step S809).

On the other hand, as a result of the judgment in the step S401, if it is not judged that the tracking error signal has the abnormal value (the step S401: Yes), "0" is substituted for the variable "f" under the control of the control device 10 (step S801a).

As a result, it is possible to monitor whether or not the gain has an optimum value, highly accurately and quickly, on the basis of the inclination in the increase and decrease direction of the abnormal value of the tracking error signal.

(9) Ninth Embodiment of Recording Apparatus

Next, a recording/reproducing apparatus 9 in a ninth embodiment of the recording apparatus of the present invention will be explained with reference to FIG. 23. Incidentally, the constituent elements in the ninth embodiment are the same as those in the aforementioned first to three embodiments, so that the explanation thereof will be omitted.

(9-1) Operation Principle

Firstly, with reference to FIG. 23, an explanation will be given on the operation principle of the recording/reproducing apparatus 9 in the ninth embodiment of the recording apparatus of the present invention. FIG. 23 is a flowchart showing the recording operation in real time by the recording/reproducing apparatus 9 in the ninth embodiment of the recording apparatus of the present invention. Incidentally, in FIG. 23, the same processes as those in the aforementioned first to eighth embodiments have the same step numbers, and the explanation thereof will be omitted.

As shown in FIG. 23, as a result of the judgment in the aforementioned step S401, if it is judged that the tracking error signal has the abnormal value (the step S401: No), each process in the aforementioned step S104 and step S105 is performed under the control of the control device 10.

Then, under the control of the control device 10, the gain that holds the predetermined value is selected by the tracking gain selection circuit 32T in order that the actuator does not follow the abnormal value of the tracking error signal in the abnormal section, i.e. in order that the tracking process is not performed (or is set Off) (step S901). Incidentally, the gain that holds the predetermined value may be selected, quickly and accurately, on the basis of a predetermined equation and a predetermined table.

Specifically, the maximum value of the section that the actuator does not follow the abnormal value of the tracking error signal, i.e. the section that the tracking process is not performed (or is set Off), i.e. a Maximum Off Possible Angle "Atr" may be determined by the following equation (10).

$$Atr = <Tp/\{(Rl-Rs)/180\}> \times (1/m) \tag{10}$$

wherein, Atr: Maximum Off Possible Angle (degree)
Tp: Track pitch (m)
Rl: Maximum radial position of target track (m)
Rs: Minimum radial position of target track (m).

More specifically, according to the study by the inventors, it is found that the radial position in one track varies depending on e.g. the angle from the reference position, because of an influence of eccentricity on the optical disc. Specifically, a difference in the maximum radial position in a target track is (Rl–Rs), and the difference is caused by rotation from the maximum radial position "Rl" to the minimum radial position "Rs" by a semicircle (or 180 degrees). Therefore, {(Rl–Rs)/180} in the equation (10) indicates the displacement in the radial direction of the track if the rotation is performed only by 1 degree. Thus, <Tp/{(Rl–Rs)/180}> in the equation (10) indicates an angle in which the displacement is performed only by 1 track in the radial direction. This means that in the case that the tracking process is not performed, if the rotation is performed by this angle, the various actuators are shifted by one track in the radial direction. Incidentally, it is additionally stated that in fact, the radial positions of the various actuators are not changed, but the radial position of the track is shifted by one track because of the influence of eccentricity. The aforementioned specific example explains the case that the shift is only one track; however, it is desirable that the allowable range is set up to a constant "1/m" of one track in view of the recording property (or recording film property) in the recording layer or the like. Moreover, a constant "m" is preferably about "10". However, as "m" is increased, the Maximum Off Possible Angle "Atr" is further reduced. Thus, it is also found that the tracking process is stabilized.

Back in FIG. 23.

Then, under the control of the control device 10, the tracking driving circuit 33T outputs the actual driving signal S33T to which the gain that holds the predetermined value, which is selected in order that the actuator does not follow the abnormal value of the tracking error signal in the aforementioned abnormal section, i.e. in order that the tracking process is not performed (or is set Off), is applied, and the tracking actuator 55T is driven (step S902). More specifically, the various actuators are controlled to maintain the previous positions before they are set Off.

In the aforementioned fourth to ninth embodiments, (i) the recording operation is performed on the basis of the tracking error signal; however, (ii) the recording operation may be performed on the basis of the focus error signal, or the power control determined by the OPC, in addition to or instead of the tracking error signal.

In the aforementioned embodiments, the recording/reproducing apparatus for additional recording or writing once, such as a DVD-R recorder and a DVD+R recorder, is explained as one example of the recording apparatus. The present invention, however, can be applied to a recording/reproducing apparatus for rewriting, such as a multiple layer type optical disc, such as a DVD-R recorder and a DVD+R recorder. Moreover, it can be applied to a recording/reproducing apparatus for large-capacity recording, which uses a blue laser for the recording/reproduction.

The present invention is not limited to the aforementioned embodiments, and various changes may be made, if desired, without departing from the essence or spirit of the invention which can be read from the claims and the entire specification. A recording apparatus and method, a reproducing apparatus and method, a recording/reproducing apparatus and method, and a computer program for recording control or reproduction control, and an information recording medium all of which involve such changes, are also intended to be within the technical scope of the present invention.

INDUSTRIAL APPLICABILITY

The recording apparatus and method, the reproducing apparatus and method, the recording/reproducing apparatus and method, and the computer program according to the present invention can be applied to a recording/reproducing apparatus, such as a DVD recorder and a DVD player, for recording/reproducing the data with respect to a recording medium, such as a DVD and a CD (Compact Disc). Moreover, they can be applied to an information recording/reproducing apparatus or the like which is mounted on various computer equipment for consumer use or for commercial use, or which can be connected to various computer equipment.

The invention claimed is:

1. A recording apparatus comprising:
   a recording device for recording data by irradiating laser light onto a disc-shaped recording medium;
   a driving device for performing tracking control and focus control, in the recording;
   a servo device for performing automatic control on said driving device, on the basis of an error signal in the at least one of the tracking control and the focus control;
   a specifying device for specifying an abnormal area by showing an angle from a standard position, in which a property of the recording medium is not good, on the basis of a high-frequency component included in the error signal in the tracking control and the focus control; and
   a controlling device for (i) controlling said servo device to change a control condition to a predetermined value in order not to perform a tracking process, in the automatic control; in addition to (ii) controlling said recording device to change a recording condition of the laser light, in the specified abnormal area.

2. The recording apparatus according to claim 1, wherein said specifying device specifies the abnormal area, on the basis of eccentricity acceleration, runout acceleration, and warping acceleration, in a rotation operation of the recording medium, as the property.

3. The recording apparatus according to claim 1, wherein said specifying device includes an eccentricity acceleration detecting device for detecting eccentricity acceleration, a runout acceleration detecting device for detecting runout acceleration, and a warping acceleration detecting device for detecting warping acceleration.

4. The recording apparatus according to claim 1, wherein said specifying device specifies the abnormal area, on the basis of a comparison between a value of the high-frequency component and a predetermined threshold value.

5. The recording apparatus according to claim 1, wherein
a concentric or spiral recording track for recording the data is formed on the recording medium, and
said specifying device specifies the abnormal area on the basis of the high-frequency component, which is periodically generated in the recording track.

6. The recording apparatus according to claim 1, wherein said controlling device (i) controls said servo device to increase gain in the automatic control from a standard value, as the control condition, and/or (ii) controls said recording device to increase a recording power of the laser light from a standard value, as the recording condition.

7. The recording apparatus according to claim 1, further comprising an obtaining device for obtaining extent of the error signal in the specified abnormal area,
said controlling device controlling said servo device, on the basis of a table which indicates an optimum value of extent of gain in the automatic control, with a value which indicates the obtained extent of the error signal as a parameter.

8. The recording apparatus according to claim 1, further comprising an obtaining device for obtaining extent of the error signal in the specified abnormal area,
said controlling device controlling said recording device, on the basis of a table which indicates an optimum value of extent of a recording power of the laser light, with a value which indicates the obtained extent of the error signal as a parameter.

9. The recording apparatus according to claim 1, wherein said controlling device controls said servo device (i) to change extent of gain in the automatic control in one direction when a value which indicates extent of the error signal increases and (ii) to change the extent of the gain in another direction when the value which indicates the extent of the error signal decreases.

10. The recording apparatus according to claim 1, wherein said controlling device controls said recording device (i) to change extent of a recording power of the laser light in one direction when a value which indicates extent of the error signal increases and (ii) to change the extent of the recording power in another direction when the value which indicates the extent of the error signal decreases.

11. The recording apparatus according to claim 1, wherein said controlling device controls said servo device and said recording device, on the basis of position information which indicates a position of the specified abnormal area.

12. The recording apparatus according to claim 11, wherein said controlling device controls said servo device and said recording device, in a period or a section which indicates a high-level value included in a wind comparator signal as the position information.

13. The recording apparatus according to claim 1, wherein said controlling device further controls said servo device and said recording device to record the data, for a trial use.

14. The recording apparatus according to claim 1, wherein said controlling device controls said servo device and said recording device (i) to disrupt the recording, (ii) to change the control condition and the recording condition, and (iii) to restart the recording, in a recording area including the specified abnormal area.

15. The recording apparatus according to claim 1, wherein said controlling device controls said servo device and said recording device, on the basis of identification information which indicates whether or not the control condition and the recording condition is changed.

16. The recording apparatus according to claim 1, wherein said controlling device controls said servo device not to operate the automatic control in the specified abnormal area.

17. The recording apparatus according to claim 1, wherein said controlling device controls said servo device not to operate the automatic control, on the basis of an equation or a table which indicates a predetermined relationship.

18. The recording apparatus according to claim 1, wherein
said recording device includes a diffracting device for diffracting the laser light,
said diffracting device generates (i) a main beam which is used to perform process of the recording of the data, reproduction of the data, the tracking control, and the focus control and (ii) two sub beams which are used to perform said process,
said recording device records the data by irradiating the laser light included in the main beam and the sub beams, and
said controlling device controls said recording device, on the basis of the high-frequency component.

19. The recording apparatus according to claim 1, further comprising a polarizing element for changing a polarization direction of the laser light and a refractive-index changing element for changing a refractive index of the laser light,
said controlling device further controlling said polarizing element to change the polarization direction of the laser light at high speed, in the specified area, or controlling said refractive-index changing element to change the refractive index of the laser light at high speed, in the specified abnormal area.

20. A reproducing apparatus comprising:
a reproducing device for reproducing data by irradiating laser light onto a disc-shaped recording medium;
a driving device for performing tracking control and focus control, in the reproduction;
a servo device for performing automatic control on said driving device, on the basis of an error signal in the tracking control and the focus control;
a specifying device for specifying an abnormal area by showing an angle from a standard position, in which a property of the recording medium is not good, on the basis of a high-frequency component included in the error signal in the tracking control and the focus control; and
a controlling device for (i) controlling said servo device to change a control condition to a predetermined value in order not to perform a tracking process, in the automatic control; in addition to (ii) controlling said reproducing device to change a reproduction condition of the laser light, in the specified abnormal area.

21. A recording method on a recording apparatus comprising: (i) a recording device for recording data by irradiating laser light onto a disc-shaped recording medium; and (ii) a driving device for performing tracking control and focus control, in the recording, said recording method comprising:
a servo process of performing automatic control on said driving device, on the basis of an error signal in the tracking control and the focus control;
a specifying process of specifying an abnormal area by showing an angle from a standard position, in which a property of the recording medium is not good, on the basis of a high-frequency component included in the error signal in the tracking control and the focus control; and
a controlling process of (i) controlling said servo device to change a control condition to a predetermined value in order not to perform a tracking process, in the automatic control; in addition to (ii) controlling said recording device to change a recording condition of the laser light, in the specified abnormal area.

22. A reproducing method on a reproducing apparatus comprising: (i) a reproducing device for reproducing data by irradiating laser light onto a disc-shaped recording medium; and (ii) a driving device for performing tracking control and focus control, in the reproduction, said reproducing method comprising:
   a servo process of performing automatic control on said driving device, on the basis of an error signal in the tracking control and the focus control;
   a specifying process of specifying an abnormal area by showing an angle from a standard position, in which a property of the recording medium is not good, on the basis of a high-frequency component included in the error signal in the tracking control and the focus control; and
   a controlling process of (i) controlling said servo device to change a control condition to a predetermined value in order not to perform a tracking process, in the automatic control; in addition to (ii) controlling said reproducing device to change a reproduction condition of the laser light, in the specified abnormal area.

23. The recording apparatus according to claim 1, wherein said specifying device specifies the abnormal area in which the property of the recording medium is not good, on the basis of the high-frequency component included in the error signal, which is obtained from a leading beam of the sub beams.

24. The recording apparatus according to claim 1, wherein said specifying device specifies the abnormal area at a same rotation angle, on the basis of the high-frequency component included in the error signal in the tracking control and the focus control, in each track.

* * * * *